US008602888B2

(12) United States Patent
Kaneko

(10) Patent No.: US 8,602,888 B2
(45) Date of Patent: Dec. 10, 2013

(54) VIDEO GAME DEVICE AND IMAGE PROCESSING PROGRAM

(75) Inventor: Takafumi Kaneko, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1674 days.

(21) Appl. No.: 11/167,222

(22) Filed: Jun. 28, 2005

(65) Prior Publication Data
US 2006/0046844 A1    Mar. 2, 2006

(30) Foreign Application Priority Data

Aug. 31, 2004    (JP) ................................. 2004-253143

(51) Int. Cl.
*A63F 9/00*    (2006.01)

(52) U.S. Cl.
USPC .......................................................... 463/32

(58) Field of Classification Search
USPC .......................................................... 463/32
See application file for complete search history.

(56) References Cited

U.S. PATENT DOCUMENTS

| | | | | | |
|---|---|---|---|---|---|
| 5,060,280 | A | * | 10/1991 | Mita et al. | 382/283 |
| 5,769,718 | A | * | 6/1998 | Rieder | 463/31 |
| 6,017,272 | A | * | 1/2000 | Rieder | 463/31 |
| 6,040,841 | A | * | 3/2000 | Cohen et al. | 345/473 |
| 6,139,433 | A | * | 10/2000 | Miyamoto et al. | 463/32 |
| 6,342,892 | B1 | * | 1/2002 | Van Hook et al. | 345/503 |
| 6,361,438 | B1 | * | 3/2002 | Morihira | 463/31 |
| 6,688,981 | B2 | * | 2/2004 | Shigeno | 463/32 |
| 6,828,969 | B2 | * | 12/2004 | Kitsutaka | 345/441 |
| 2001/0049300 | A1 | * | 12/2001 | Okamoto et al. | 463/30 |
| 2002/0163519 | A1 | * | 11/2002 | Kitsutaka | 345/440 |
| 2002/0177481 | A1 | | 11/2002 | Kitsutaka | |
| 2003/0216177 | A1 | * | 11/2003 | Aonuma et al. | 463/32 |
| 2004/0012607 | A1 | * | 1/2004 | Witt | 345/592 |
| 2004/0157661 | A1 | | 8/2004 | Ueda et al. | |

FOREIGN PATENT DOCUMENTS

| | | |
|---|---|---|
| EP | 1 386 645 A1 | 2/2004 |
| JP | 2 902 352 | 3/1999 |
| JP | 3 141 737 | 12/2000 |
| WO | WO 01/88854 A2 | 11/2001 |
| WO | WO 2004/072935 A2 | 8/2004 |

OTHER PUBLICATIONS

Foley, Chris. "Nuclear Apocalypse is just as cool the second time around". Nov. 3, 1998. <http://www.gamerswanted.com/platform/pc/280/reviews/76/>.*

(Continued)

*Primary Examiner* — Seng H Lim
(74) *Attorney, Agent, or Firm* — Nixon & Vanderhye P.C.

(57) ABSTRACT

A character object CH1 is first projected onto a screen plane, and a masked area is rendered as a circular area that is centered about the position of the character object CH1 projected onto the screen plane. The obtained image data is stored in a main memory as mask data, and is used when rendering each object in a virtual game space. A transparency flag is set in advance for each of field objects OB1 to OB3. The field object OB1 whose transparency flag is "1" is rendered by using the mask data, whereas the character object CH1 and the field objects OB2 and OB3 whose transparency flag is "0" are rendered normally. Thus, it is possible to provide a video game device capable of displaying a particular object such as the player character so that it can always be seen, with minimum detraction from the atmosphere of the game field.

25 Claims, 32 Drawing Sheets

(56) References Cited

OTHER PUBLICATIONS

Foley, Chris. "Nuclear Apocalypse is just as cool the second time around". Nov. 3, 1998. <http://www.gamerswanted.com/pc/280/screenshots/5/>.*

Foley, Chris. "Nuclear Apocalypse is just as cool the second time around." Fallout 2 Review. Nov. 3, 1998. <http://www.gamerswanted.com/pc/280/reviews/76/>.*

Examination Report mailed May 5, 2011 in European Application No. 05 014 162.1 (5 pages).

Viega et al., "3D Magic Lenses," UIST, 1996, pp. 2-7.

Chittaro et al., "Is Semitransparency Useful for Navigating Virtual Environments?," Proceedings of the 8th ACM Symposium on Virtual Reality Software & Technology (VRST 2001), ACM Press, New York, Nov. 2001 (9 pages).

Mammen et al., "Transparency and Antialiasing Algorithms Implemented with the Virtual Pixel Maps Technique," IEEE Computer Graphics and Applications, Jul. 1989, pp. 43-55.

European Search Report mailed May 19, 2010 in European Application No. 05014162.1.

\* cited by examiner

VIDEO GAME DEVICE AND IMAGE PROCESSING PROGRAM

BACKGROUND

1. Field of theTechnology

The present technology relates to a video game device and an image processing program, and more particularly to a video game device and an image processing program capable of solving the problem that a player character controlled by a player is hidden behind a building, which may occur when an image of a building, for example, is rendered in a 3D virtual game space together with an image of the player character.

2. Description of the Background Art

In a video game where a player controls a player character in a 3D virtual game space, the player character may be hidden behind a building in the game screen when the player character moves between buildings. In such a case, it is typical in the prior art that the player's viewpoint is shifted so that the player character can be seen. Depending on the type of the video game, it may be preferred that the game image is displayed such that the virtual game space is always viewed from the same direction without shifting the viewpoint.

Japanese Patent No. 2902352 discloses a technique in which a transparency operation is performed on a wall or a floor only when they are overlapping with, or close to, the display position of the player character so that the player character can always be seen on the display screen.

Japanese Patent No. 3141737 discloses a technique in which it is determined whether or not an obstacle is hiding a subject, and a transparency operation is performed on the obstacle only when the obstacle is hiding the subject so that the player character can always be seen on the display screen.

With the technique of Japanese Patent No. 2902352, when the player character is hidden behind a wall of a building, the wall is entirely made transparent, thereby significantly altering the atmosphere of the game field. Similarly with the technique of Japanese Patent No. 3141737, when the subject is hidden behind an obstacle, the obstacle is entirely made transparent, thereby significantly altering the atmosphere of the game field due to the abrupt disappearance of the obstacle. With either technique, each object needs to be rendered after determining whether or not it is hiding the player character (or the subject) based on the positional relationship between the object, the player character (or the subject) and the viewpoint, for each of a plurality of objects such as a wall or an obstacle. Therefore, the processing load for the determination process increases as the number of objects increases.

SUMMARY

Therefore, a feature of an exemplary embodiment presented herein is to provide a video game device capable of displaying a particular object such as the player character so that it can always be seen, with minimum detraction from the atmosphere of the game field.

Another feature of an exemplary embodiment presented herein is to provide a novel video game device and a novel game program capable of displaying a particular object such as the player character so that it can always be seen by appropriately performing a transparency operation on objects such as a wall or an obstacle without having to determine whether or not an object is hiding the player character based on the positional relationship between the object, the player character and the viewpoint for each of the objects.

The exemplary embodiment presented herein has the following to attain the features mentioned above. Note that reference numerals, figure numbers and supplementary explanations are shown in parentheses below for assisting the reader in finding corresponding components in the figures to facilitate the understanding of the exemplary embodiment. It is understood that these parenthetic expressions are in no way intended to restrict the scope of the exemplary embodiment.

A first aspect of an exemplary embodiment presented herein is directed to a video game device including control means (20) operated by a user, object storing means (28, 66), mask data producing means (24, 26, 54, S 16), mask data storing means (28, 86), projection means (24, 26, 56), game image producing means (24, 26, 58) and display control means (24, 26, 60).

The object storing means (28, 66) stores a position of each of a plurality of objects including at least one first object (CH1, CH2, . . . ) present in a 3D virtual game space. The mask data producing means (24, 26, 54, S16) produces mask data (FIG. 12, FIG. 14, FIG. 19, FIG. 34, FIG. 38) according to a position of the first object in the virtual game space. The mask data storing means (28, 86) stores the mask data produced by the mask data producing means. The projection means (24, 26, 56) projects each object present in the virtual game space onto a screen plane defined in the virtual game space (by either a perspective projection or a parallel projection). The game image producing means (24, 26, 58) renders each object based on a result of the projection by the projection means to produce a game image. The display control means (24, 26, 60) displays the game image produced by the game image producing means on a display device (12). The mask data producing means produces mask data such that each object is made transparent (i.e., the object is not displayed or displayed to be semi-transparent) in a predetermined masked area including a position of the first object in a screen of the display device while each object is displayed normally (i.e., an opaque object is displayed to be opaque and a semi-transparent object is displayed to be semi-transparent) in a remaining area. The game image producing means does not perform a masking process (S38) when rendering the first object and performs the masking process using the mask data (S36) only when rendering a second object (OB1, OB2, . . . ) being an object other than the first object present in the virtual game space.

According to a second aspect, in the first aspect, the video game device further includes transparent object identification information storing means (28, 84) for storing transparent object identification information that indicates whether or not to perform the masking process using the mask data for each second object. The game image producing means performs the masking process using the mask data (S34) only for a particular second object or particular second objects according to the transparent object identification information stored in the transparent object identification information storing means (FIG. 6).

According to a third aspect of an exemplary embodiment, in the first aspect, the game image producing means performs the masking process using the mask data (S42) only for a second object that is closer to the viewpoint defined in the virtual game space than a reference position (88) predetermined with respect to the viewpoint (FIG. 24).

According to a fourth aspect of an exemplary embodiment, in the third aspect, the game image producing means performs the masking process using the mask data only for a second object that is closer to the viewpoint defined in the virtual game space than the first object.

According to a fifth aspect of an exemplary embodiment, in the third aspect, the video game device further includes reference position determination means (24, S44, S46) for, where there are a plurality of first objects in a viewing volume defined in the virtual game space, determining the reference position to be a position of one of the plurality of first objects that is farthest away from the viewpoint defined in the virtual game space. The game image producing means performs the masking process using the mask data only for a second object that is closer to the viewpoint defined in the virtual game space than the reference position determined by the reference position determination means (FIG. 29).

According to a sixth aspect of an exemplary embodiment, in the first aspect, the mask data producing means produces mask data (depth mask data, FIG. 34, FIG. 40) such that each object is made transparent in a predetermined masked space (FIG. 32, FIG. 33) extending from the position of the first object in the virtual game space to the viewpoint defined in the virtual game space while each object is displayed normally in a remaining area.

According to a seventh aspect of an exemplary embodiment, in the sixth aspect, where there are a plurality of first objects in a viewing volume defined in the virtual game space, the mask data producing means produces mask data defining a plurality of masked spaces each having a length according to a position of the corresponding first object (FIG. 32).

According to an eighth aspect of an exemplary embodiment, in the first aspect, the game image producing means changes an alpha value of each dot of each object according to the mask data, and determines a color of each pixel of the game image through an alpha blending operation based on the changed alpha value.

According to a ninth aspect of an exemplary embodiment, in the first aspect, the first object is a player character controlled by the user operating the control means.

According to a tenth aspect of an exemplary embodiment, in the first aspect, the mask data producing means produces mask data (FIG. 14, FIG. 38) such that each object is made transparent (i.e., the object is not displayed or displayed to be semi-transparent) in a predetermined masked area including a position of the first object in a screen of the display device while each object is displayed normally (i.e., an opaque object is displayed to be opaque and a semi-transparent object is displayed to be semi-transparent) in a remaining area, with a transparency of each object being gradually varied around a boundary of the masked area.

According to an eleventh aspect of an exemplary embodiment, in the first aspect, the mask data producing means produces mask data having a lower resolution than that of the game image produced by the game image producing means. The game image producing means uses the mask data while enlarging the mask data.

According to a twelfth aspect of an exemplary embodiment, in the first aspect, the projection means perspectively projects each object present in the virtual game space onto the screen plane based on the viewpoint defined in the virtual game space. The mask data producing means changes a size of the masked area according to a distance from the viewpoint defined in the virtual game space to the first object (FIG. 17B, FIG. 17C).

A thirteenth aspect of an exemplary embodiment is directed to a storage medium storing an image processing program for instructing a computer (24, 26, 28) of a video game device including control means (20) operated by a user to function as object storing means (28, 66), mask data producing means (24, 26, 54, S 16), mask data storing means (28, 86) for storing the mask data produced by the mask data producing means, projection means (24, 26, 56), game image producing means (24, 26, 58) and display control means (24, 26, 60).

The object storing means (28, 66) stores a position of each of a plurality of objects including at least one first object (CH1, CH2, . . . ) present in a 3D virtual game space. The mask data producing means (24, 26, 54, S16) produces mask data (FIG. 12, FIG. 14, FIG. 19, FIG. 34, FIG. 38) according to a position of the first object in the virtual game space. The mask data storing means (28, 86) stores the mask data produced by the mask data producing means. The projection means (24, 26, 56) projects each object present in the virtual game space onto a screen plane defined in the virtual game space (by either a perspective projection or a parallel projection). The game image producing means (24, 26, 58) renders each object based on a result of the projection by the projection means to produce a game image. The display control means (24, 26, 60) displays the game image produced by the game image producing means on a display device (12).

The mask data producing means produces mask data such that each object is made transparent (i.e., the object is not displayed or displayed to be semi-transparent) in a predetermined masked area including a position of the first object in a screen of the display device while each object is displayed normally (i.e., an opaque object is displayed to be opaque and a semi-transparent object is displayed to be semi-transparent) in a remaining area. The game image producing means does not perform a masking process (S38) when rendering the first object and performs the masking process using the mask data (S36) only when rendering a second object (OB1, OB2, . . . ) being an object other than the first object present in the virtual game space.

A twenty-fifth aspect of an exemplary embodiment is directed to a storage medium storing a game program for instructing a computer (24, 26) of a video game device to perform a perspective projection transformation for a plurality of objects in a 3D virtual game space based on a viewpoint defined in the virtual game space so as to render a game image to be displayed on a display screen in a rendering buffer. The game program instructs the computer to perform: an object positioning step (S10, S14), a calculation step (S24), a mask data producing step (S26), a first object rendering step (S38) and a second object rendering step (S36).

The object positioning step is a step of determining first 3D coordinates based on which a first object (CH1, CH2, . . . ) is positioned in the 3D virtual game space and second 3D position coordinates based on which a second object (OB1, OB2, . . . ) is positioned in the 3D virtual game space. The calculation step is a step of performing a perspective projection transformation for the 3D position coordinates of the first object based on the viewpoint to obtain 2D coordinates of the first object on the display screen (FIG. 11). The mask data producing step is a step of producing mask data for one screen (FIG. 12, FIG. 14, FIG. 19, FIG. 34, FIG. 38) in which a mask image of a predetermined shape (an image representing a masked area) is rendered at a position in a rendering buffer area associated with 2D coordinates on the display screen. The first object rendering step is a step of rendering the first object positioned at the first 3D coordinates in the rendering buffer while performing a perspective projection transformation, wherein the first object is rendered in the rendering buffer without referring to the mask data. The second object rendering step is a step of rendering the second object positioned at the second 3D coordinates in the rendering buffer while performing a perspective projection transformation, wherein the second object is rendered in the rendering buffer while referring to the mask data so that a transparency of a portion of the second object that overlaps with the mask image is varied from that of other portions not overlapping with the mask image (FIG. 13).

According to a twenty-sixth aspect of an exemplary embodiment, in the twenty-fifth aspect, the mask image is an image whose color depth gradually increases or decreases from a center thereof toward a periphery thereof (FIG. 14, FIG. 38). The game image is rendered in the transparency varying step so that the transparency of the second object changes according to the color depth of the mask image in an area where the mask image and the second object overlap with each other (FIG. 15, FIG. 16).

According to the first and thirteenth aspects, only a portion of an object hiding the first object that is contained within the masked area is made transparent instead of making the entire object transparent, whereby the first object can always be seen by the user without detracting from the atmosphere of the game field and without causing awkwardness such as the abrupt disappearance of the object that is hiding the first object.

According to the second and fourteenth aspects, in a case where there are a plurality of second objects, the masking process can be performed only for a particular one or particular ones of the second objects.

According to the third and fifteenth aspects, the masking process can be performed only for a second object that is closer to the viewpoint than the predetermined reference position, whereby it is possible to obtain a game image with little awkwardness by avoiding a situation where a second object much farther away from the viewpoint than the first character object is made transparent.

According to the fourth and sixteenth aspects, the masking process using the mask data is performed only for a second object that is closer to the viewpoint than the first object, whereby it is possible to obtain a game image with little awkwardness by avoiding a situation where a second object farther away from the viewpoint than the first character object is made transparent.

According to the fifth and seventeenth aspects, in a case where there are a plurality of first objects in the viewing volume defined in the virtual game space, all of the first objects contained within the viewing volume can be seen by the user, and it is possible to obtain a game image with little awkwardness by avoiding a situation where a second object farther away from the viewpoint than one of the first objects that is farthest away from the viewpoint is made transparent.

According to the sixth and eighteenth aspects, only a portion of an object that is contained within the masked space extending from the position of the first object toward the viewpoint can be made transparent, whereby it is possible to obtain a game image with little awkwardness in which only a second object located on the near side of the first character object (i.e., within the space closer to the viewpoint than the first character object) is made transparent even if the masking process using the mask data is performed for all of the second objects.

According to the seventh and nineteenth aspects, even if there are a plurality of first objects, it is possible to obtain a game image with little awkwardness in which only a second object located on the near side of each first character object is made transparent.

According to the eighth and twentieth aspects, an object can easily be made transparent or semi-transparent through an alpha blending operation by changing the alpha value of each object according to the mask data.

According to the ninth and twenty-first aspects, the player character to be controlled by the user can always be seen, thereby improving the playability of the game.

According to the tenth and twenty-second aspects, the degree of transparency of an object gradually varies around the boundary of a masked area, whereby it is possible to obtain a game image with little awkwardness even when the game image changes during the game.

According to the eleventh and twenty-third aspects, the size of the mask data is reduced, whereby it is possible to reduce the capacity of the mask data storing means.

According to the twelfth and twenty-fourth aspects, the size of a masked area is decreased as the size of the displayed first object decreases at a position farther away from the viewpoint as a result of a perspective projection, whereby it is possible to obtain a game image with reduced awkwardness.

According to the twenty-fifth aspect, a perspective projection transformation is performed for the first 3D coordinates of the first object to obtain 2D coordinates of the first object, based on which mask data for one screen is produced. The mask data is referred to when rendering a second object, and the transparency of a portion of the second object that overlaps with the mask image is varied. As a result, it is possible to eliminate the need to determine whether or not a first object and a second object are overlapping with each other, thus reducing the processing load.

According to the twenty-sixth aspect, the mask image has a color depth that gradually increases or decreases from the center thereof toward the periphery thereof, whereby the transparency changes gradually in an area where the mask image overlaps with a second object. As a result, the first object behind the second object can be seen through the second object in a manner that seems natural to the player.

These and other features, aspects and advantages of the exemplary embodiment presented herein will become more apparent from the following detailed description of the exemplary embodiment when taken in conjunction with the accompanying drawings.

DESCRIPTION OF THE PREFERRED EMBODIMENTS (First Embodiment)

A video game system according to one embodiment will now be described with reference to the drawings.

Figure 1:
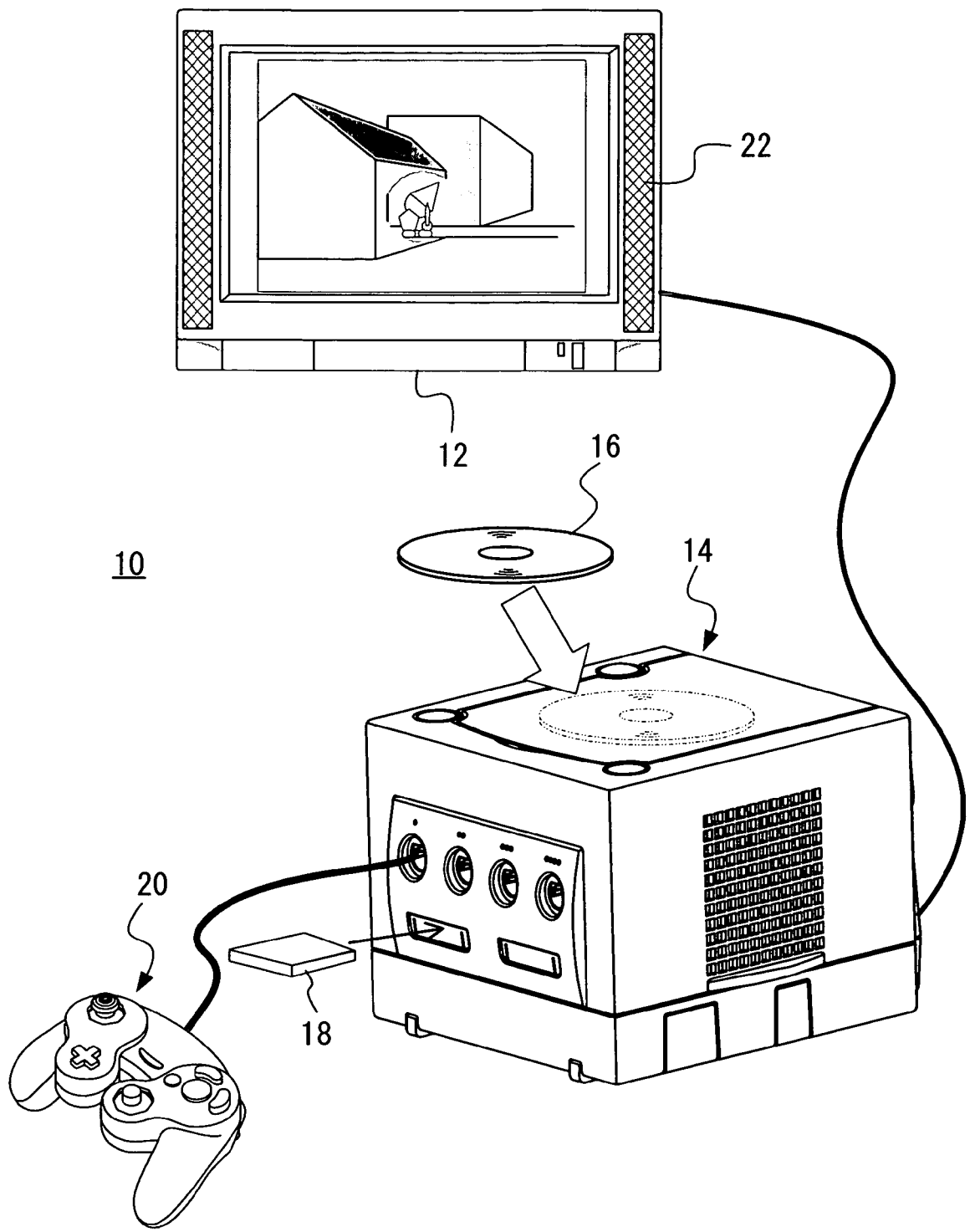
FIG. 1 generally shows a video game system according to one embodiment.

FIG. 1 generally shows a video game system according to one embodiment. Referring to FIG. 1, a video game system 10 includes a monitor 12, a video game machine 14, an optical disk 16, a memory card 18 and a controller 20. The optical disk 16 and the external memory card 18 are inserted in the video game machine 14. The controller 20 is connected, via a connection cable, to the connector of one of a plurality (four in FIG. 1) of controller ports of the video game machine 14.

The monitor 12 is connected to the video game machine 14 via an AV cable, or the like. Note that the connection between the video game machine 14 and the controller 20 may be a wireless connection.

The controller 20 is an input device with which the player gives inputs to the video game, and includes a plurality of control switches. The controller 20 outputs, to the video game machine 14, operation data indicating the state of the control switches. By operating the controller 20, the player can make the player character to move or do an action in the video game.

The optical disk 16 statically stores a game program and game data. The optical disk 16 is inserted in the video game machine 14 when the player plays the video game. Instead of the optical disk 16, the means for storing the game program, etc., may be any other suitable external storage medium such as, for example, a DVD-ROM, a CD-ROM, an MO disk, a memory card or a ROM cartridge.

The video game machine 14 reads out the game program recorded on the optical disk 16, and performs various processes according to the game program.

The monitor 12 displays a game image on the screen based on a video signal outputted from the video game machine 14. The monitor 12 includes a speaker 22, and the speaker 22 outputs game sound based on a sound signal outputted from the video game machine 14.

The memory card 18 includes, as a backup memory, a rewritable storage medium such as a flash memory, which stores saved game data, or the like.

Figure 2:
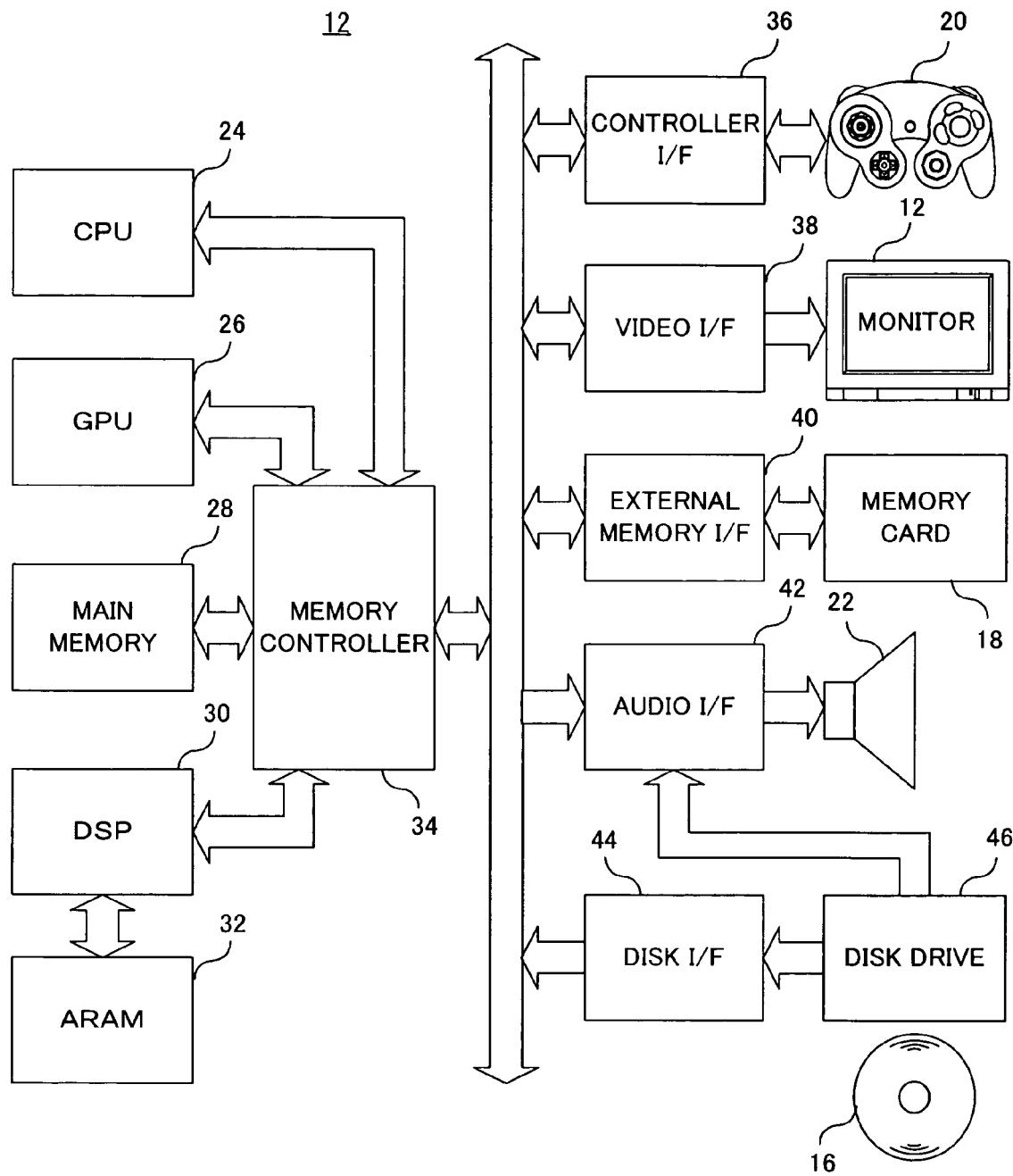
FIG. 2 shows an internal configuration of a video game machine.

FIG. 2 is a block diagram showing an internal configuration of the video game machine 14. Various components of the video game machine 14 will now be described in greater detail with reference to FIG. 2.

The video game machine 14 includes a CPU 24 and a memory controller 34 connected to the CPU 24. The memory controller 34 is connected to a GPU (Graphics Processing Unit) 26, a main memory 28, a DSP (Digital Signal Processor) 30 and various interfaces. The memory controller 34 controls the data transfer between these components.

At the start of the game, a disk drive 46 first drives the optical disk 16 inserted in the video game machine 14. The game program stored in the optical disk 16 is loaded into the main memory 28 via a disk I/F (interface) 44 and the memory controller 34. The game program loaded in the main memory 28 is executed by the CPU 24 to start a game. After the start of the game, the player makes inputs using the controller 19, in response to which the controller 20 outputs the corresponding operation data to the video game machine 14. The operation data outputted from the controller 20 is inputted to the CPU 24 via a controller I/F 36 and the memory controller 34. The CPU 24 performs the game process based on the input operation data. The game image is produced primarily by the GPU 26, and the game sound is produced primarily by the DSP 30. An ARAM (Audio RAM) 32 is used to store an audio signal.

The GPU 26 performs operations on the coordinates of each object in the 3D virtual game space (e.g., rotation, enlargement/shrinking or deformation of the object, and coordinate transformation from world coordinates to camera coordinates or screen coordinates), and renders the object being projected onto the screen plane based on texture data, etc. (by determining the color of each of the pixels corresponding to the object and writing the color in the color buffer), thus producing the game image. The color buffer is a memory area that is reserved for storing game image data (RGB data) to be displayed on the monitor 12. The GPU 26 produces a game image by using other buffers in addition to the color buffer, as necessary, including a z-buffer for storing the distance from the viewpoint to each object rendered in the color buffer, and a stencil buffer for the shadow volume algorithm.

Figure 3:
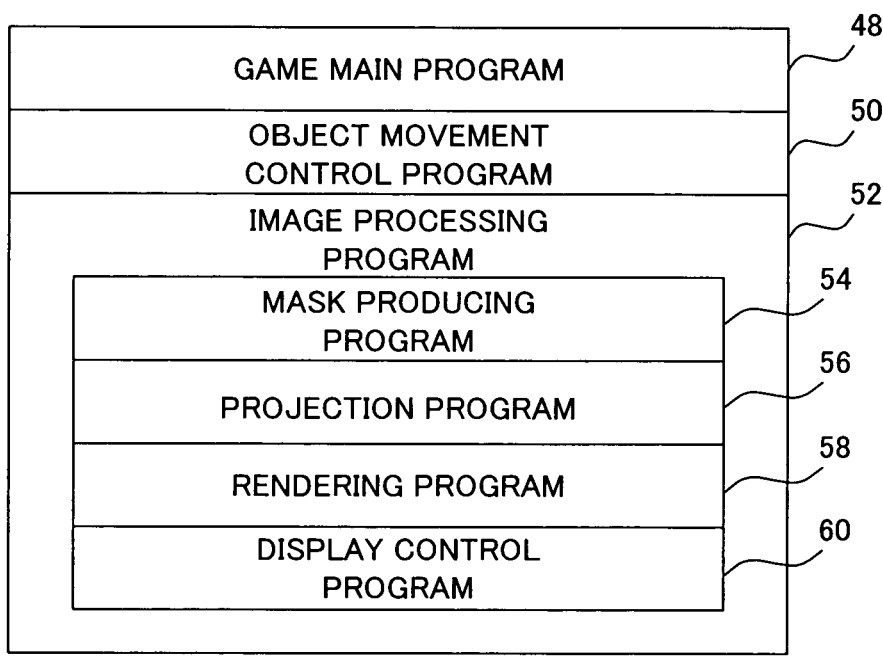
FIG. 3 shows a part of a memory map of a main memory 28.
Figure 4:
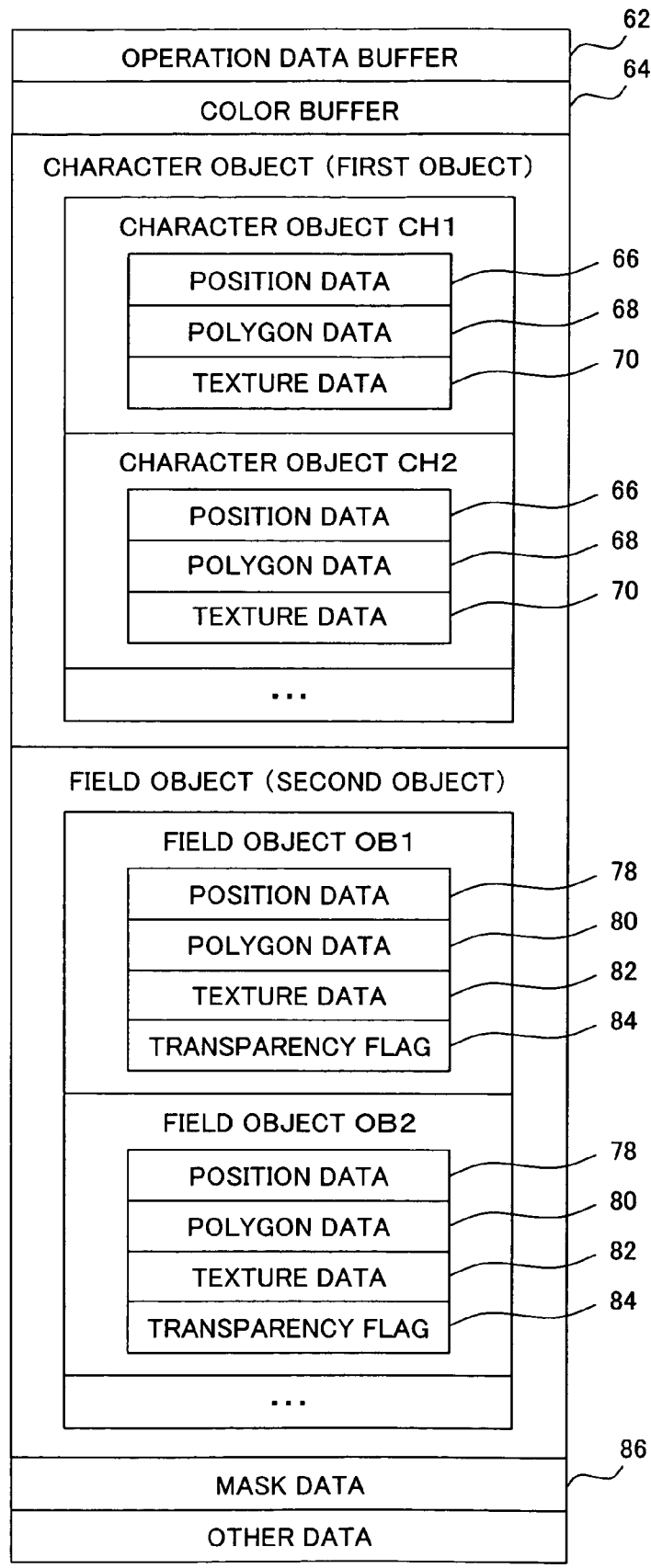
FIG. 4 shows another part of a memory map of the main memory 28.

FIG. 3 and FIG. 4 show the memory map of the main memory 28. Specifically, FIG. 3 is a memory map for programs, and FIG. 4 is a memory map for data.

Referring to FIG. 3, a game main program 48, an object movement control program 50 and an image processing program 52 are loaded from the optical disk 16 into the main memory 28.

The object movement control program 50 is a program for moving an object in the 3D virtual game space according to a predetermined algorithm or in response to user instructions. The image processing program 52 includes a mask producing program 54, a projection program 56, a rendering program 58 and a display control program 60. The mask producing program 54 is a program for instructing the CPU 24 or the GPU 26 to produce mask data to be described later. The projection program 56 is a program for instructing the CPU 24 or the GPU 26 to project an object in the virtual game space onto a predetermined screen plane. Methods of projection include a perspective projection and a parallel projection. The rendering program 58 is a program for instructing the CPU 24 or the GPU 26 to render an object in the virtual game space (i.e., write the colors of the object in the color buffer). The display control program 60 is a program for instructing the CPU 24 or the GPU 26 to periodically output a video signal to the monitor 12 based on the image data stored in the color buffer.

Referring to FIG. 4, the main memory 28 includes an area used as an operation data buffer 62, an area used as a color buffer 64, an area for storing data of character objects, an area for storing data of field objects, an area for storing mask data 86 to be described later, and an area for storing other data.

The operation data buffer 62 is a memory area for temporarily storing operation data outputted from the controller 20. The color buffer 64 is a memory area for temporarily storing color data of a game image displayed on the monitor 12.

A character object is an object representing a character in the virtual game space, and may be a player character controlled by the player or a non-player character controlled by the computer, but not by the player, according to the movement of the player character. It is assumed in the present embodiment that there are a plurality of character objects (CH1, CH2, CH3, . . . ) in the virtual game space. The main memory 28 stores, for each character object, position data 66 representing the position (3D coordinates) of the character object in the virtual game space, polygon data 68 defining the shape of the character object, and texture data 70 defining the surface texture of the character object.

A field object is one of the objects that together form the field of the virtual game space, and may be a building, a wall, the ground, a street, etc., in the virtual game space. It is assumed in the present embodiment that there are a plurality of field objects (OB1, OB2, OB3, . . . ) in the virtual game space. The main memory 28 stores, for each field object, position data 78 representing the position (3D coordinates) of the field object in the virtual game space, polygon data 80 defining the shape of the field object, texture data 82 defining the surface texture of the field object, and a transparency flag 84 to be described later.

Figure 5:
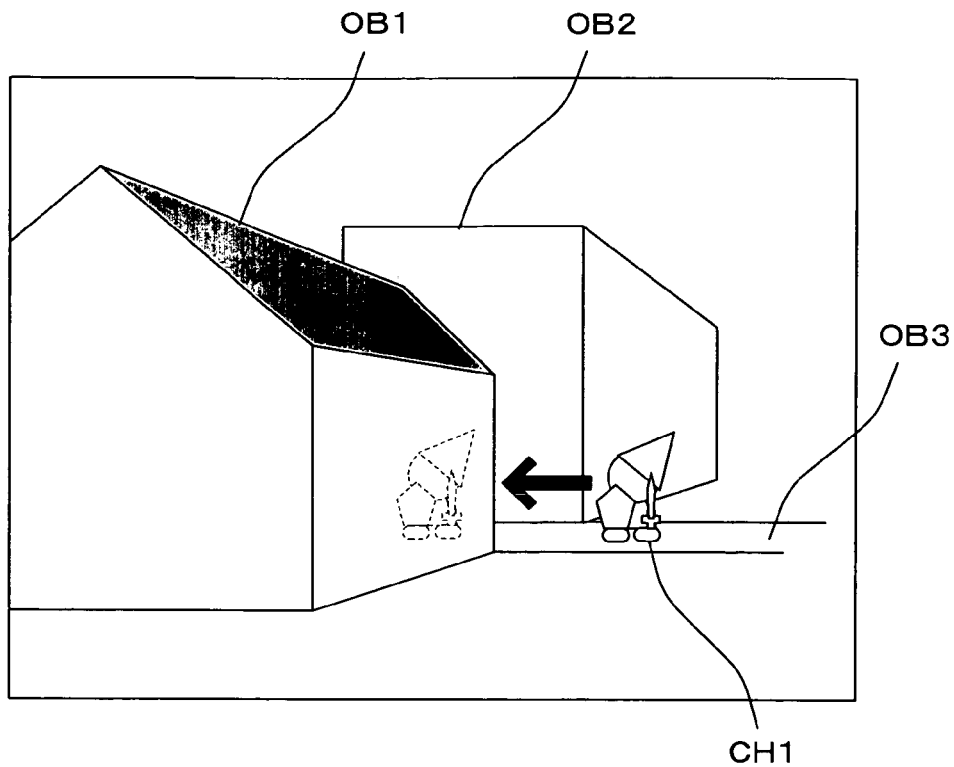
FIG. 5 shows an example of a game image according to a first embodiment.
Figure 6:
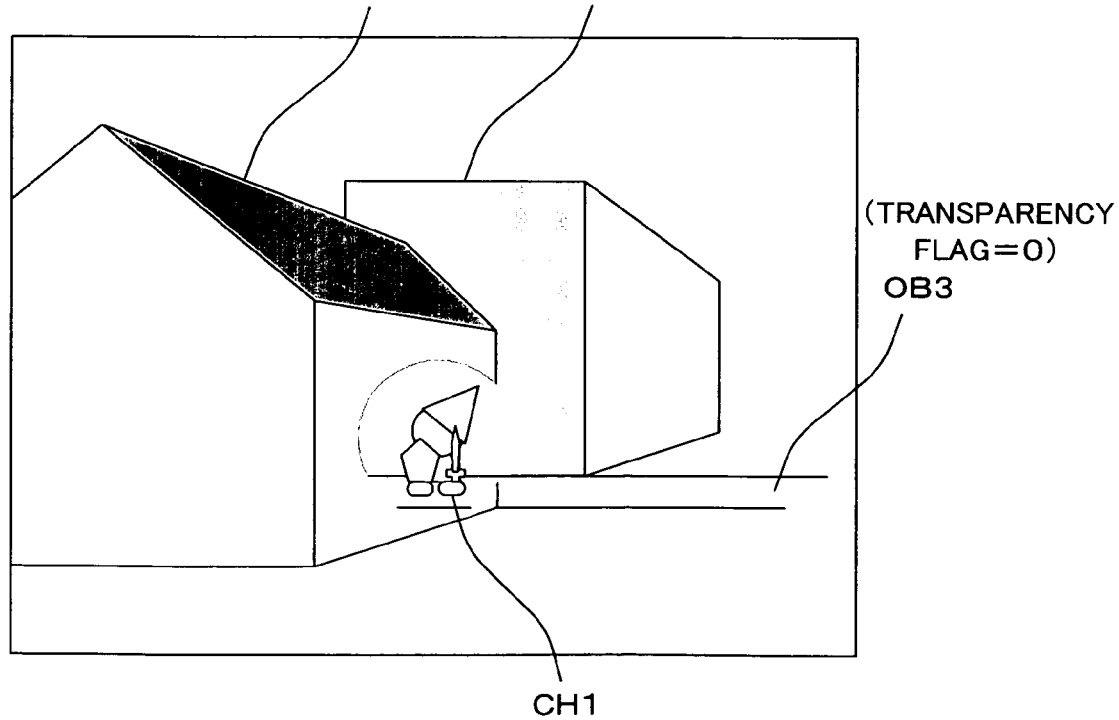
FIG. 6 shows an example of a game image according to the first embodiment.

FIG. 5 and FIG. 6 each show an example of a game screen according to a first embodiment. FIG. 5 shows the character object CH1 and the field objects OB1 to OB3 arranged in the virtual game space. When the character object CH1 moves in the direction indicated by an arrow in FIG. 5, a predetermined area of the field object OB1 that is centered about the character object CH1 is made transparent as shown in FIG. 6.

Thus, even if the character object CH1 moves behind the field object OB1, the user can see the character object CH1.

Now, the processes of the CPU 24 or the GPU 26 performed based on the programs shown in FIG. 3 will be described with reference to flow charts of FIG. 7 to FIG. 9.

Figure 7:
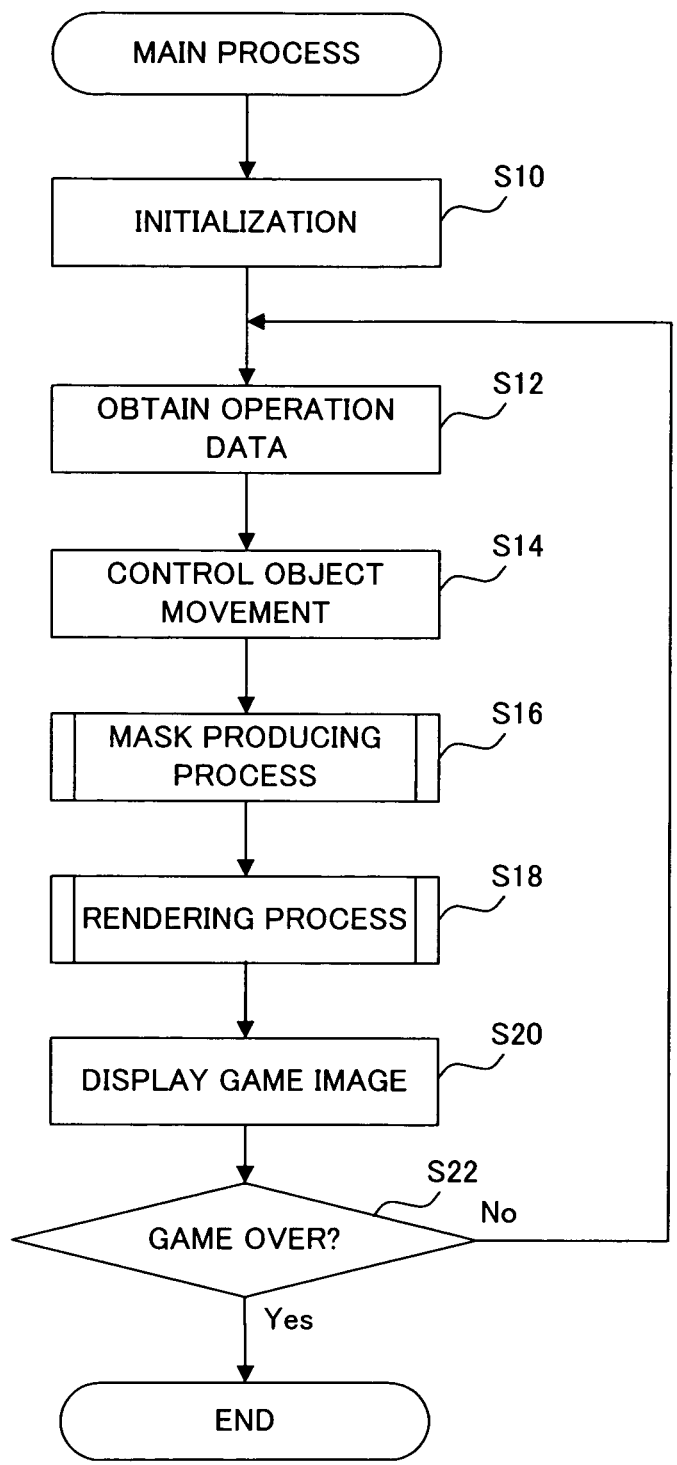
FIG. 7 shows a flow chart of a main process.
Figure 8:
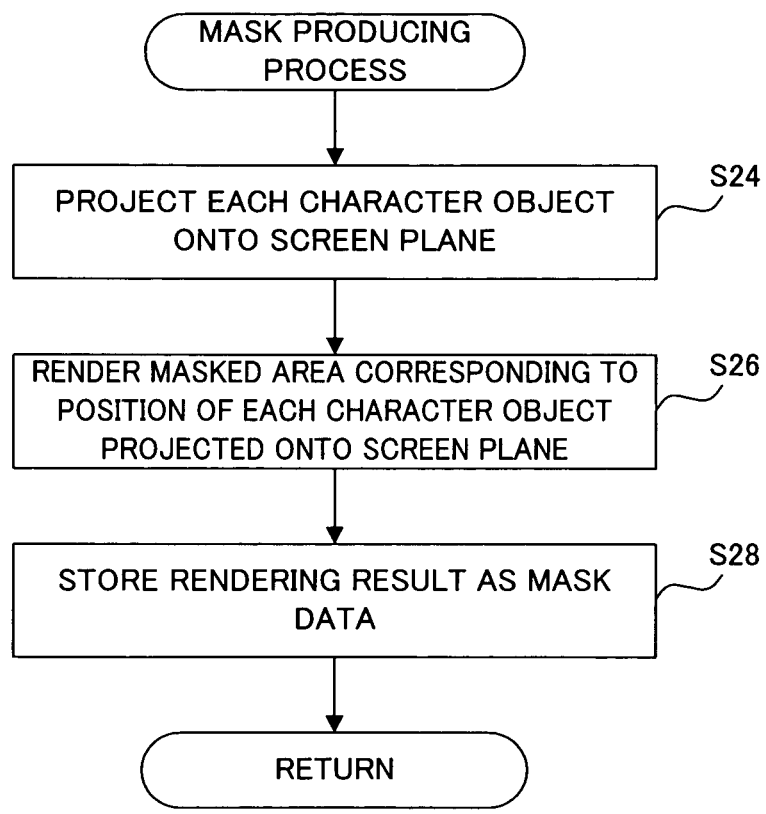
FIG. 8 shows a flow chart of a mask producing process.

Referring to FIG. 7, after the main process is started, the process first goes to step S10, where an initialization process is performed. In this process, the viewpoint, the position of each object, the position of the light source, etc., in the virtual game space are initialized. In step S12, operation data outputted from the controller 20 is stored in the operation data buffer 62. In step S14, the position of each object in the virtual game space is updated based on the object movement control program 50 of FIG. 3. Specifically, if the character object CH1 is a player character, which is controlled based on the player's operation of the controller 20, the position of the character object CH1 is updated based on the operation data stored in the operation data buffer 62 in step S12. Of course, the character object CH1 may alternatively be a non-player character attacking the player character, for example. Then, the position of the character object CH1 is updated based on a stored program according to the position of the player character.

In step S16, a mask producing process is performed based on the mask producing program shown in FIG. 3. The details of the mask producing process will be described later. In step S18, a rendering process is performed based on the rendering program 58 shown in FIG. 3, whereby a game image to be displayed on the monitor 12 is stored in the color buffer 64. The details of the rendering process will also be described later. In step S20, a video signal based on the game image stored in the color buffer 64 is outputted to the monitor 12 based on the display control program 60 shown in FIG. 3, whereby the game image is displayed on the screen of the monitor 12. In step S22, it is determined whether or not the game is over. If the game is not over, the process returns back to step S12. While the game is not over, steps S12 to S18 are repeated with a ⅓₀-second period, for example.

Figure 10:
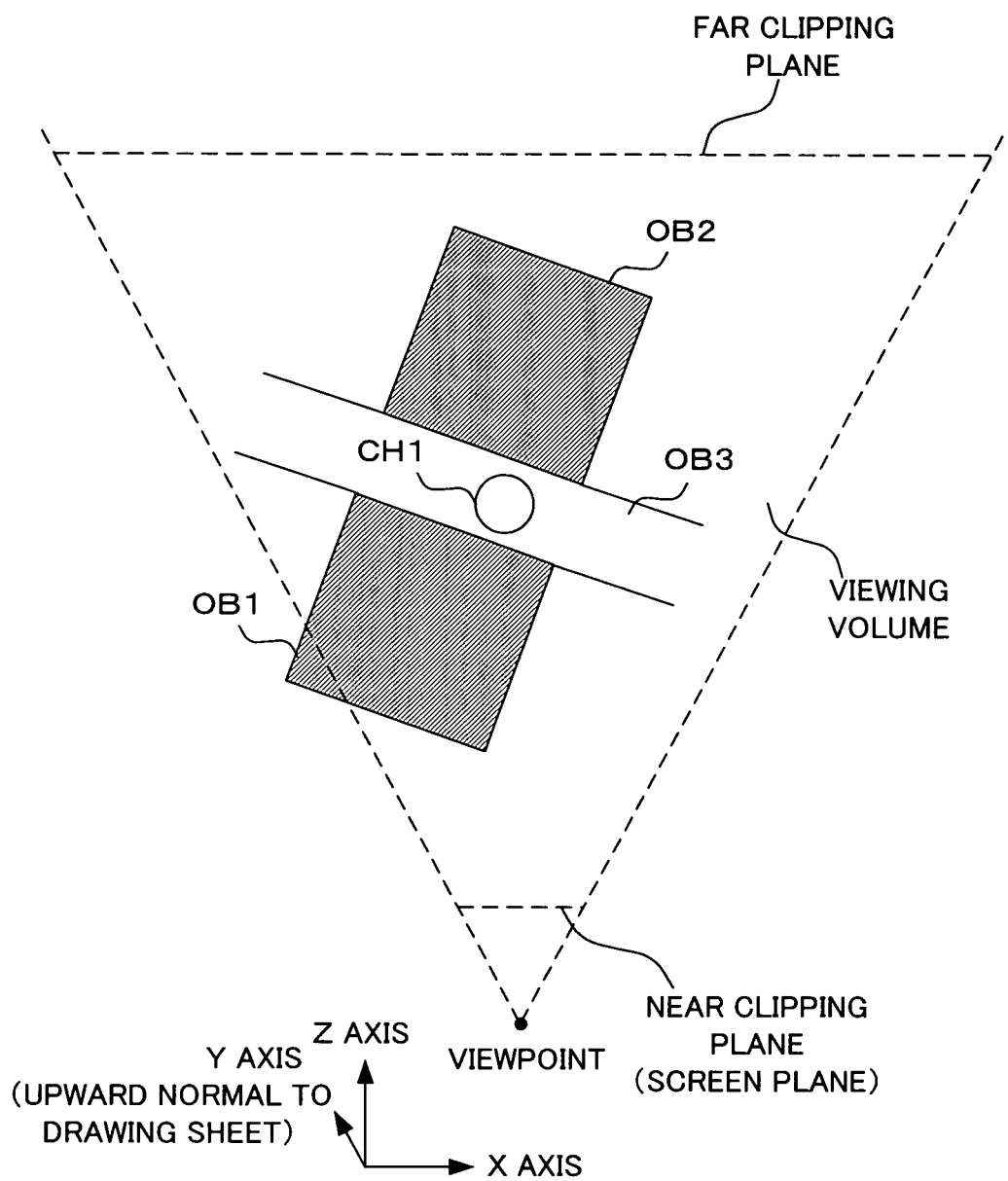
FIG. 10 shows an example of how objects are arranged in a virtual game space.

Now, the details of the mask producing process will be described with reference to the flow chart of FIG. 8. It is assumed herein that the viewpoint and the objects (the character object CH1 and the field objects OB1 to OB3) are arranged in the virtual game space as shown in FIG. 10. FIG. 10 shows the game space as viewed from a direction vertical to the line of sight. Referring to FIG. 10, objects that are contained within the space defined between the near clipping plane and the far clipping plane (the viewing volume) are to be displayed. While objects are rendered by a perspective projection in the example of FIG. 10, the present invention is not limited to this, and objects may be rendered by a parallel projection. It is assumed herein that the transparency flag 84 is "1" for the field object OB1 and "0" for the field object OB2 and the field object OB3, as shown in FIG. 6.

Figure 11:
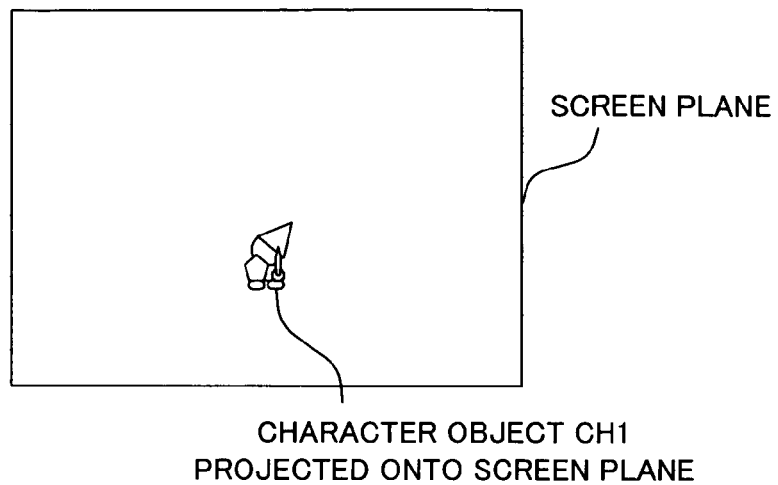
FIG. 11 shows a character object being projected onto the screen plane in a mask data producing process.

After the mask producing process is started, the process first goes to step S24, where each character object (the character object CH1 in the example of FIG. 5) is projected onto the screen plane defined in the virtual game space based on the projection program 56 of FIG. 3. Specifically, the position coordinates (3D coordinates) of each character object in the 3D virtual game space are subjected to a perspective projection transformation based on the viewpoint to obtain coordinates (2D coordinates) of the character object on the display screen of the monitor 12. While the screen plane is used as the near clipping plane in the example of FIG. 10, the exemplary embodiment presented herein is not limited to this. The projection operation is typically done by subjecting vertex coordinates of each polygon of each character object to a coordinate transformation using a predetermined transformation matrix. FIG. 11 shows the character object CH1 being projected onto the screen plane. While each polygon of the character object CH1 is projected onto the screen plane in the illustrated example, the present invention is not limited to this, and only a point indicating the position of the character object CH1 may be projected onto the screen plane.

Figure 12:
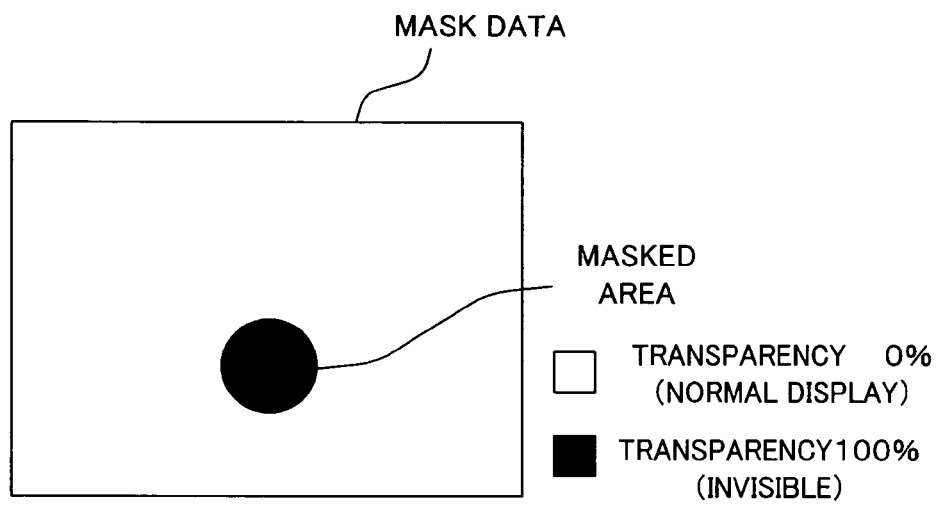
FIG. 12 shows an example of mask data produced in a mask data producing process.

In step S26, monochrome image data as shown in FIG. 12 is produced based on the position of each character object projected onto the screen plane. Specifically, the process renders a circular area (masked area) as shown in FIG. 12 that is centered about the position of each character object projected onto the screen plane. The color buffer 64 may be temporarily used for the rendering of the masked area.

In step S28, image data obtained in step S26 is stored in the main memory 28 as mask data. The resolution of image data stored as mask data does not have to be the same as that of the game image, but the image data may be stored in the main memory 28 after the resolution thereof is lowered from that of the game image. Then, it is possible to save the memory area of the main memory 28 required for storing mask data. When mask data with a lowered resolution is used in the rendering process to be described later, the resolution of the mask data stored in the main memory 28 can be converted to that of game image.

Now, the details of the rendering process will be described with reference to the flow chart of FIG. 9.

After the rendering process is started, the process first goes to step S30, where an object to be rendered in the color buffer is determined. While the order in which objects are rendered is arbitrary, objects may be rendered in a predetermined order as necessary. For example, by rendering opaque objects first and then semi-transparent objects, the semi-transparency operation (alpha blending) may be facilitated. For example, by first rendering objects farther away from the viewpoint and then closer objects, hidden-surface removal is achieved without performing a z-test using the z-buffer.

In step S32, it is determined whether or not the object to be rendered as determined in step S30 is a character object. The process proceeds to step S38 if the object is a character object, and to step S34 otherwise (i.e., if it is a field object).

In step S34, it is determined with reference to the main memory 28 whether or not the transparency flag 84 of the field object to be rendered is "0". The process proceeds to step S38 if the transparency flag 84 is "0", and to step S36 otherwise (i.e., if is "1").

Figure 13:
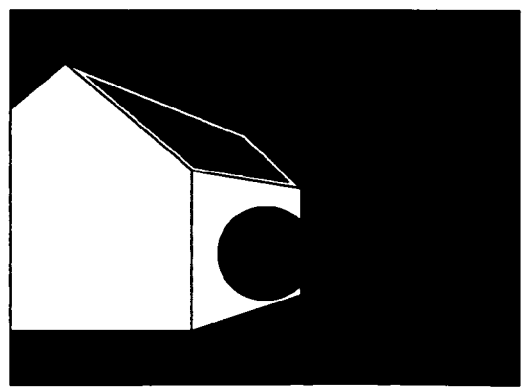
FIG. 13 shows a field object rendered by using the mask data.

In step S36, the object to be rendered (a field object whose transparency flag is "1") is rendered by using the mask data 86 stored in the main memory 28 in the mask producing process. The transparency of each pixel of the object to be rendered is determined based on the value of each pixel of a mask image (an image of the masked area) included in the mask data 86 for one screen. Specifically, when an object in the 3D virtual game space is rendered in the color buffer 64 through a perspective projection transformation, the process refers to the mask data 86 stored in the main memory 28 so that the transparency of a portion of the object that overlaps with the masked area is changed to 100% (whereby the portion contained within the masked area is not rendered in the color buffer 64) while the transparency is not changed for the rest of the object (whereby the rest of the object is displayed normally). For example, with the mask data of FIG. 12, the field object OB1 will be rendered as shown in FIG. 13.

In step S38, the object to be rendered (a character object or a field object whose transparency flag is "0") is rendered normally, i.e., without referring to the mask data 86 stored in the main memory 28 in the mask producing process.

In step S40, it is determined whether or not the rendering process is completed (i.e., whether or not all of the objects contained within the viewing volume have been rendered). If the rendering process is not complete, the process returns back to step S30 to determine and render the next object. If the rendering process is complete, the process proceeds to step S20 of FIG. 7, where a game image as shown in FIG. 6, for example, is displayed on the monitor 12.

While a portion of an object contained within the masked area is not rendered at all in the present embodiment, the exemplary embodiment presented herein is not limited to this. For example, a portion of an object contained within the masked area may be made semi-transparent. In such a case, the alpha value (a value that determines the transparency) of a portion of an object contained within the masked area can be changed to an appropriate value, before performing an alpha blending operation based on the changed alpha value.

Figure 14:
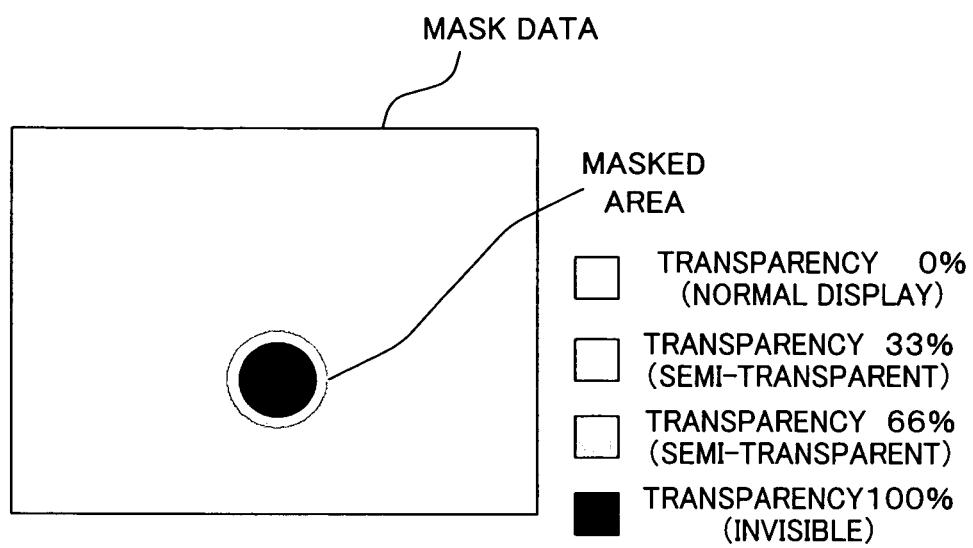
FIG. 14 shows an example of mask data produced in a mask data producing process.
Figure 15:
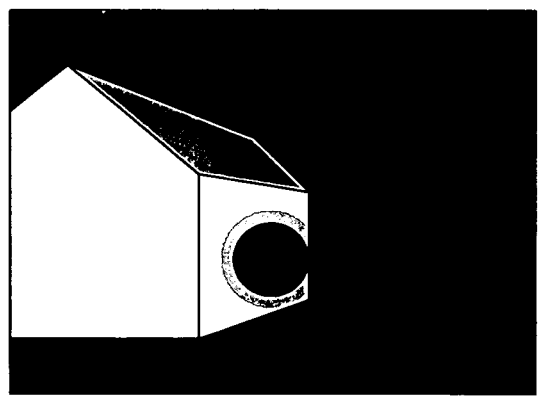
FIG. 15 shows a field object rendered by using the mask data.
Figure 16:
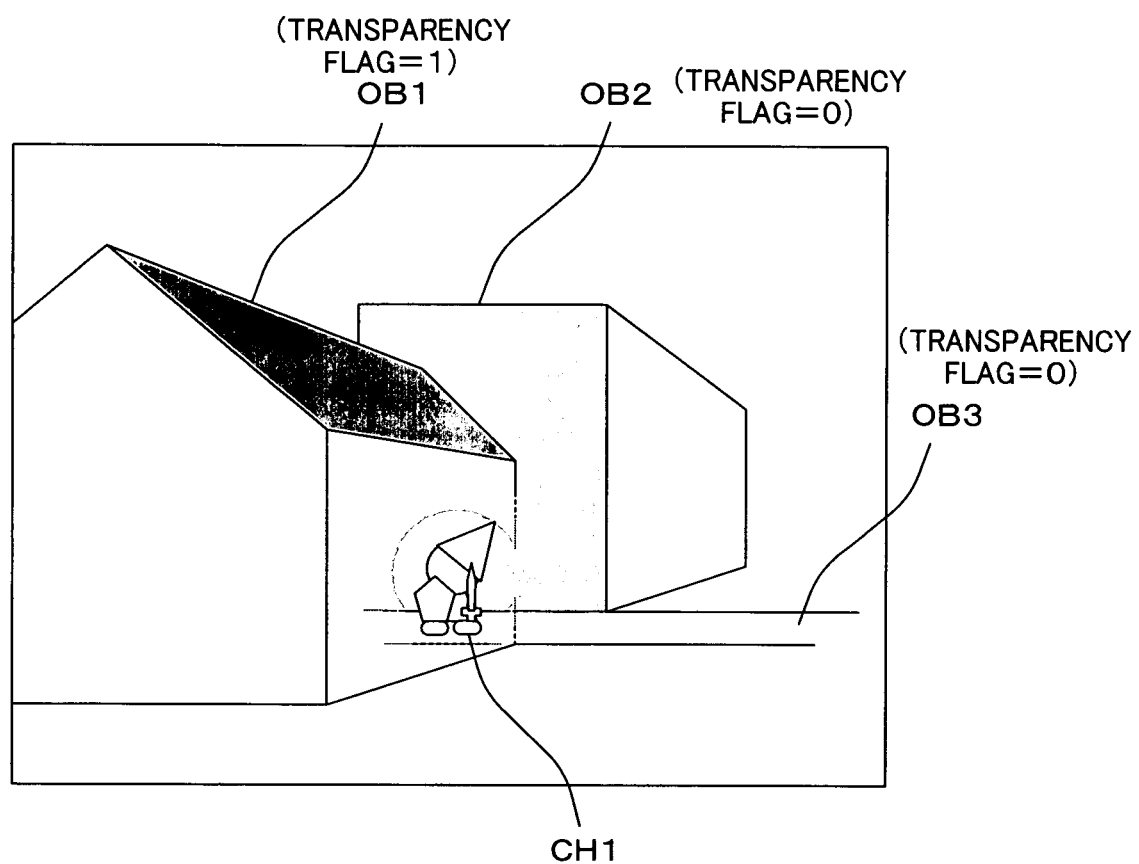
FIG. 16 shows an example of a game image according to the first embodiment.

While binary image data as shown in FIG. 12 is used as mask data in the present embodiment, the exemplary embodiment presented herein is not limited to this, and image data with more gray levels may be used. FIG. 14 shows an example where the mask data is image data using four different values for different transparencies. Specifically, in the mask data shown in FIG. 14, the transparency of the object is gradually varied around the boundary of the masked area. FIG. 15 shows the field object OB1 rendered by using the mask data. The transparency (alpha value) of the field object OB1 is changed according to the value of the mask data, and a game image as shown in FIG. 16 is produced through an alpha blending operation based on the changed alpha value. In the example of FIG. 16, a portion of the field object OB1 around the boundary of the masked area has gradually varying transparencies. Such a game image will appear more elegant and beautiful than that of FIG. 6.

While a circular masked area is used in the present embodiment, the exemplary embodiment presented herein is not limited to this, and the masked area may be of any other suitable shape (e.g., elliptical, rectangular or star-shaped).

Figure 17A:
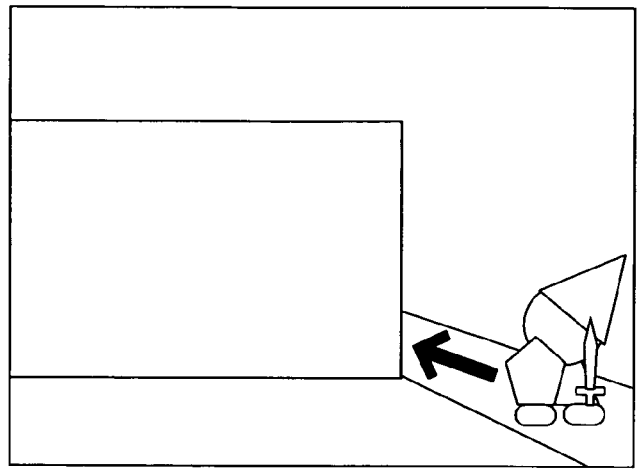
FIG. 17A shows an example of a game image according to the first embodiment.
Figure 17B:
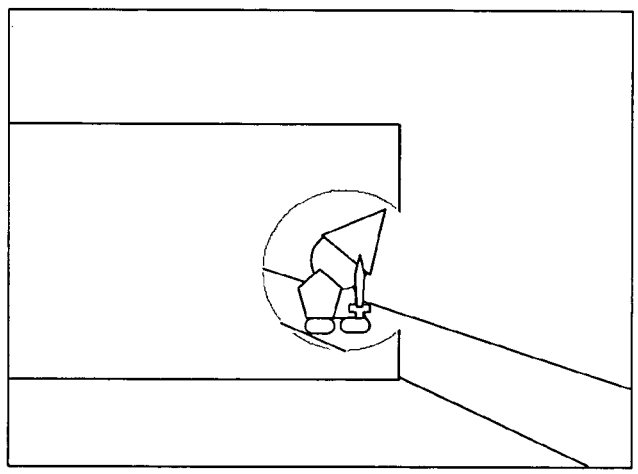
FIG. 17B shows an example of a game image according to the first embodiment.
Figure 17C:
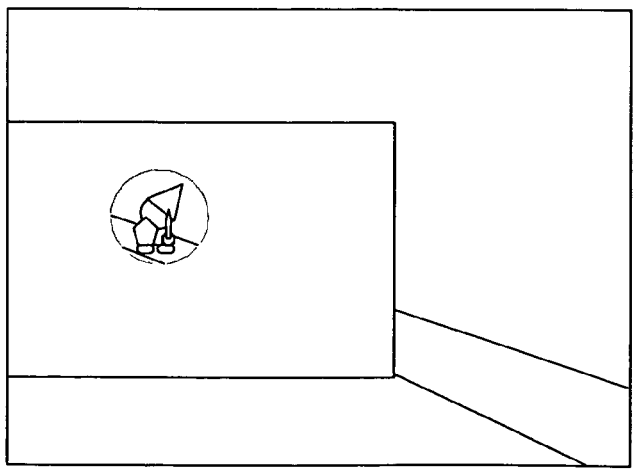
FIG. 17C shows an example of a game image according to the first embodiment.

The size of the masked area may be fixed, or may change according to the size or state of the character object. The size of the masked area may be changed according to the distance from the viewpoint to the character object. Particularly, where a game image is produced by a perspective projection, it is preferred that the size of the masked area is reduced as the character object moves away from the viewpoint as shown in FIG. 17B and FIG. 17C when the character object moves in the direction indicated by an arrow in FIG. 17A, for example. Then, it is possible to obtain a sophisticated game image while the character object can always be seen.

Figure 18:
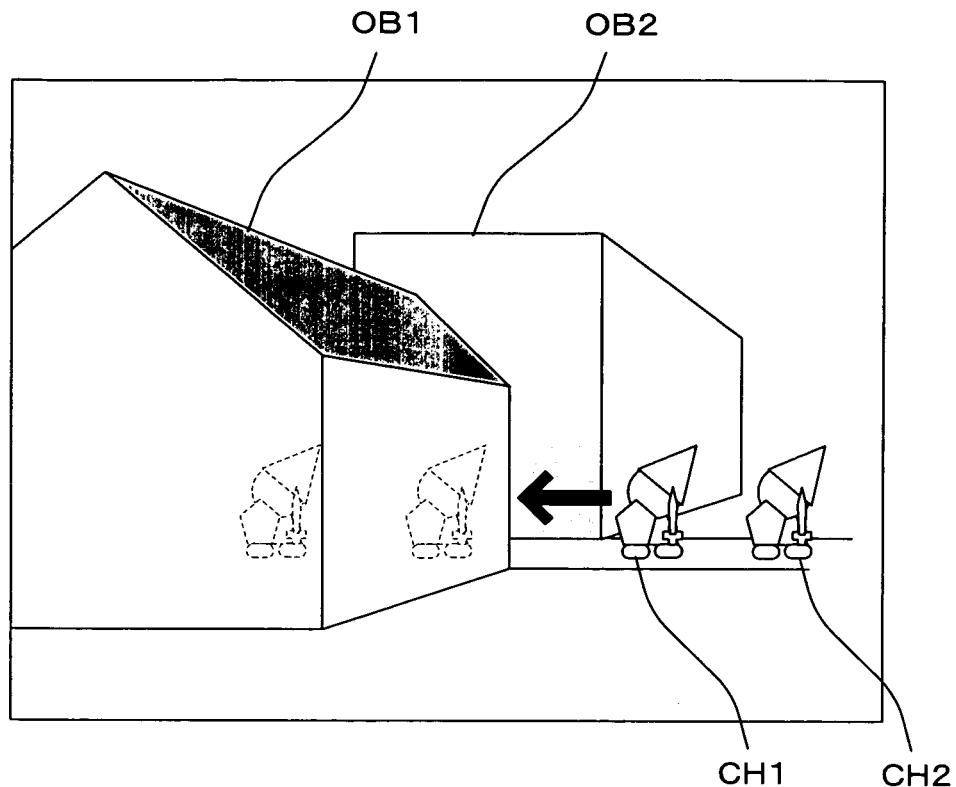
FIG. 18 shows an example of a game image according to the first embodiment.
Figure 19:
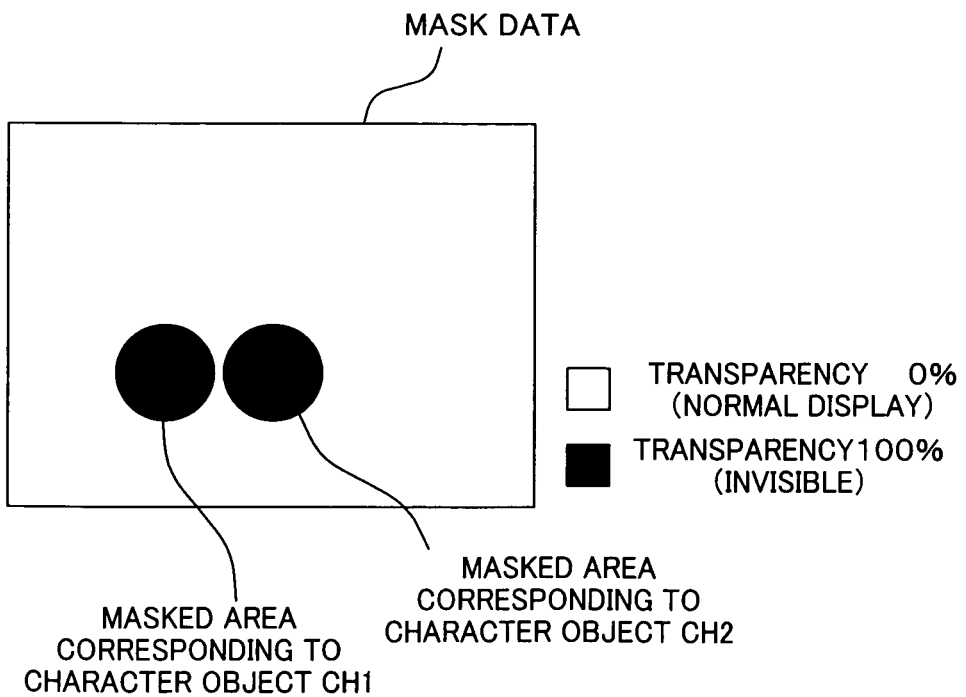
FIG. 19 shows an example of mask data produced in a mask data producing process.
Figure 20:
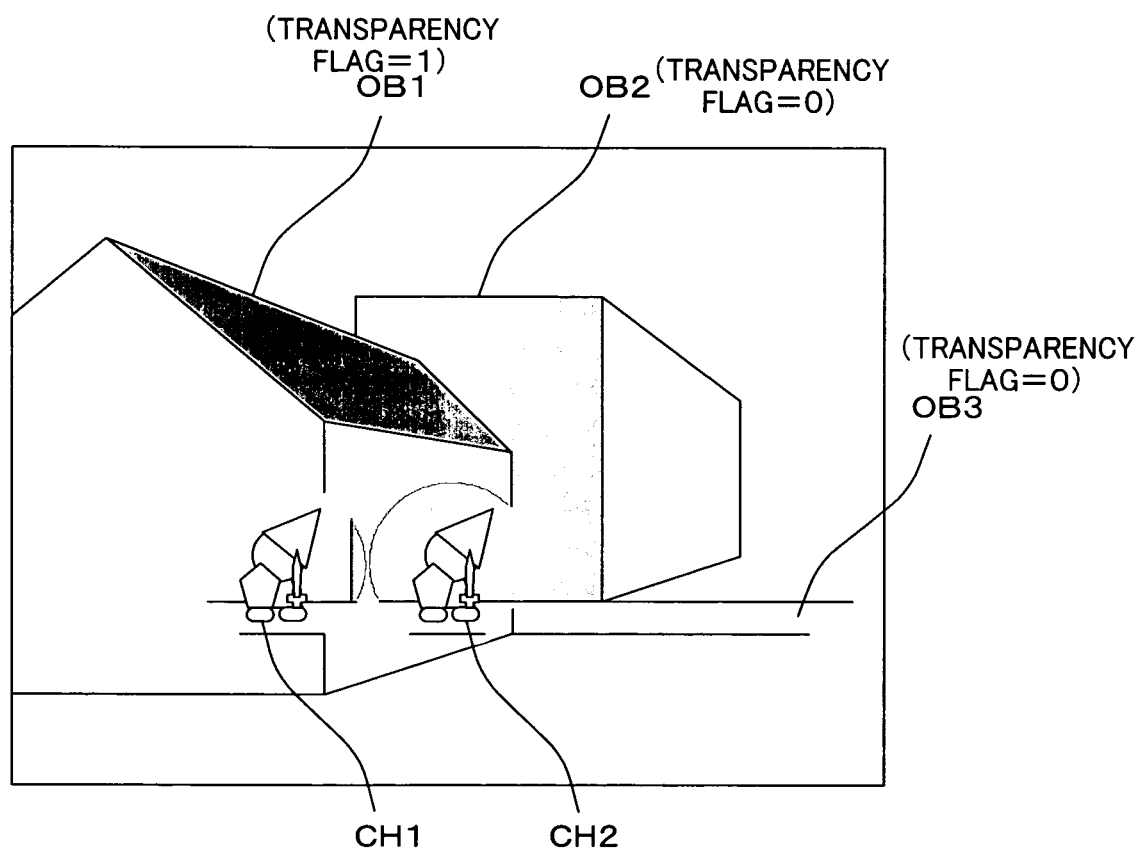
FIG. 20 shows an example of a game image where a plurality of character objects are displayed.

There is only one masked area in FIG. 12 since there is only one character object being projected onto the screen plane in the example of FIG. 11. Where there are a plurality of character objects as shown in FIG. 18, a plurality of masked areas are produced in the mask data corresponding to the plurality of character objects (the character objects CH1 and CH2 in the illustrated example) as shown in FIG. 19. By rendering a field object whose transparency flag is "1" (the field object OB1 in the illustrated example) by using the mask data of FIG. 19, a game image as shown in FIG. 20 is obtained.

While the transparency flag 84 is set to be "1" for the field object OB1 and "0" for the field objects OB2 and OB3 of FIG. 10 in the present embodiment, the value of the transparency flag of each field object is appropriately determined in advance in view of the position of the field object and the viewpoint. For example, the transparency flag is set to be "0" for a field object representing the ground since a character object will not usually be hidden behind the ground. In contrast, the transparency flag is set to be "1" for a field object representing something located at a higher position than a character object (e.g., a sail of a ship) since such an object is likely to be hiding the character object if the viewpoint is located above the character object. The transparency flag may be set to be "0" for a field object that is smaller than a character object or a field object that is semi-transparent since it is unlikely that such an object will significantly block the view of the character object.

If it is acceptable that the game image might look awkward, all field objects may be subjected to the masking process using mask data, without using transparency flags. An advantage of this is that the character object will at least be seen at any time.

As described above, according to the first embodiment, mask data is produced based on the position of a character object, and field objects are subjected to the masking process using the produced mask data, whereby the character object can always be seen.

(Second Embodiment)

A second embodiment will now be described.

Figure 21:
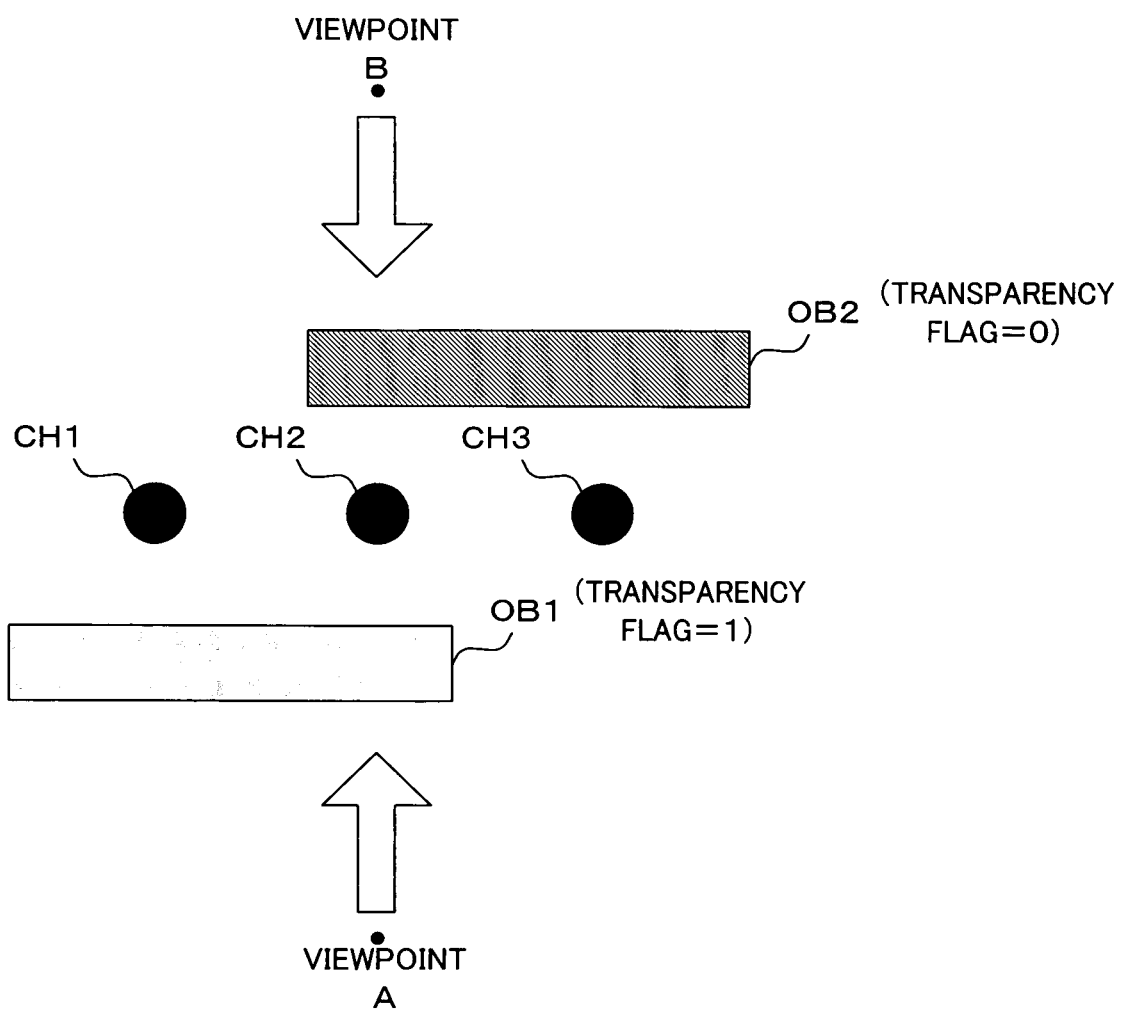
FIG. 21 shows an example of how objects are arranged in a virtual game space.
Figure 22:
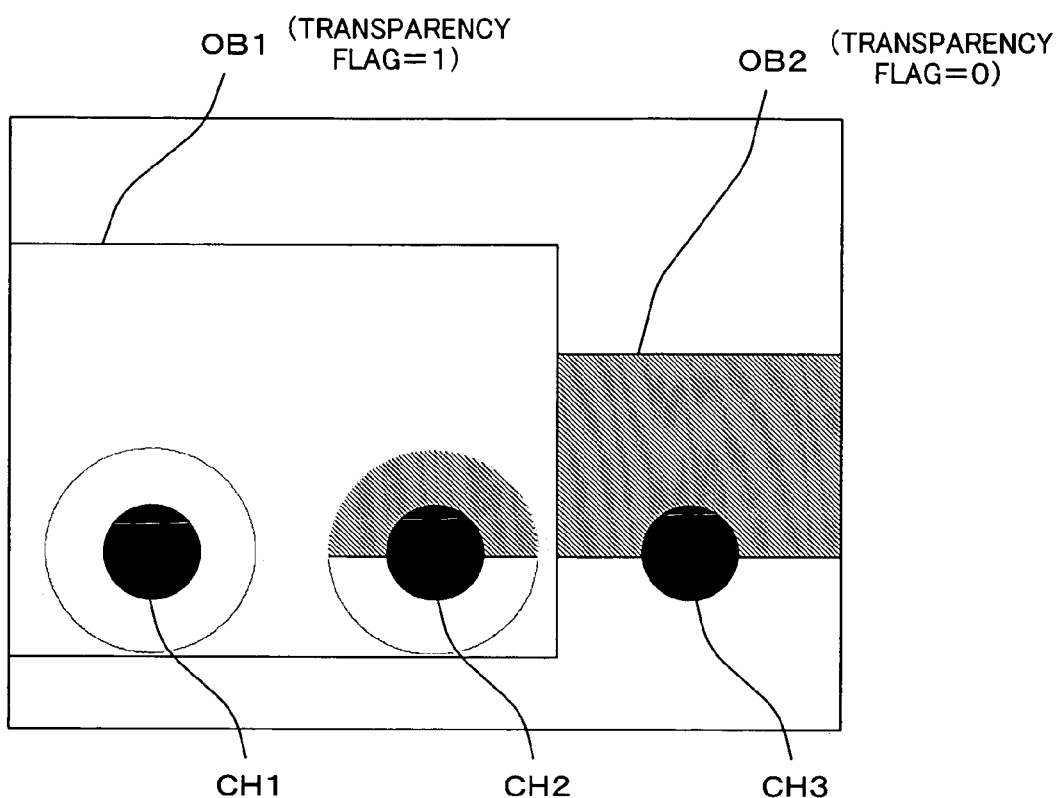
FIG. 22 shows an example of a game image.
Figure 23:
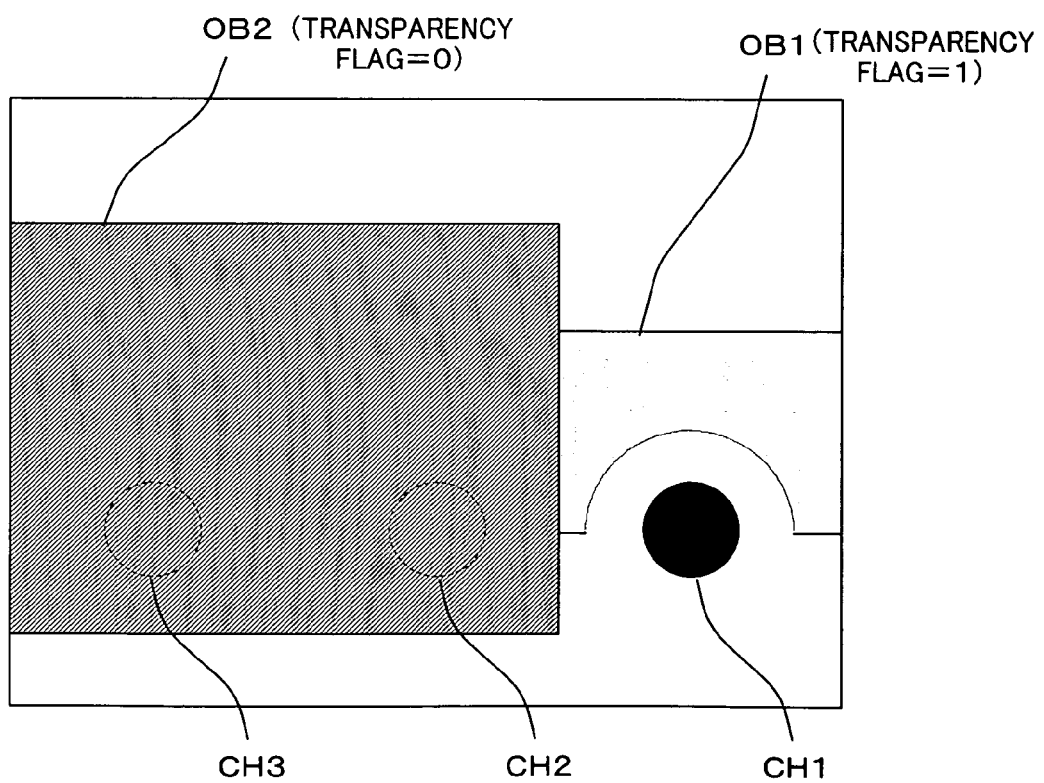
FIG. 23 shows an example of a game image.

Consider a case where a plurality of objects (the character objects CH1 to CH3 and the field objects OB1 and OB2) are arranged in the 3D virtual game space as shown in FIG. 21. It is assumed that the transparency flag is "1" for the field object OB1 and "0" for the field object OB2. If the scene as viewed from a viewpoint A of FIG. 21 is rendered by the method of the first embodiment, a game image as shown in FIG. 22 will be obtained. In the game image of FIG. 22, the character objects CH1 to CH3 are displayed appropriately. However, if the scene as viewed from a viewpoint B of FIG. 21 is rendered by the method of the first embodiment, the character objects CH1 and CH2 will not be displayed as shown in FIG. 23. Moreover, a portion of the field object OB1 is omitted unnecessarily due to the masked area corresponding to the character object CH1, resulting in an awkward game image. The second embodiment solves such a problem.

In the second embodiment, the masking process using mask data is performed only on field objects that are closer to the viewpoint than a predetermined reference position. The reference position may be defined as an absolute position in the virtual game space, as a relative position with respect to the viewpoint, or as the position of a particular character object.

Figure 24:
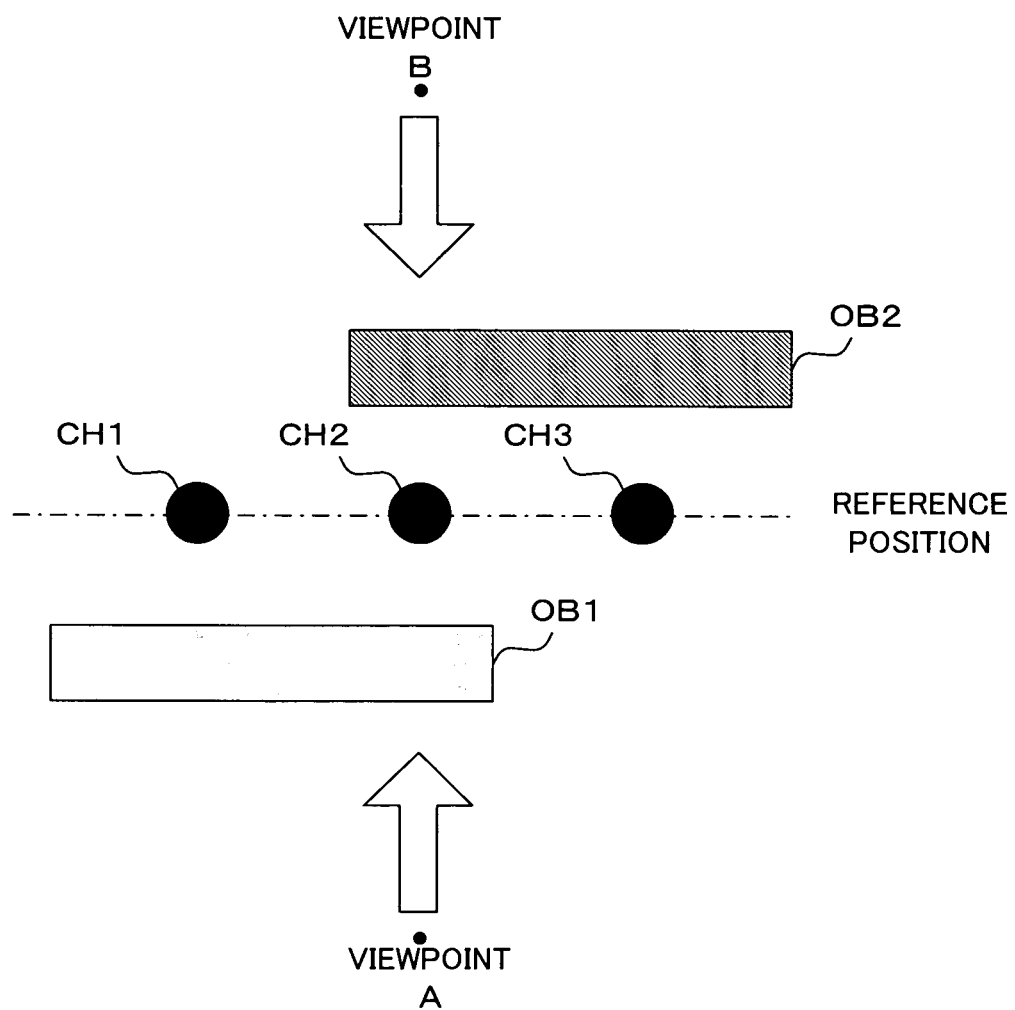
FIG. 24 shows an example of how objects are arranged in a virtual game space.

For example, consider a case where a plurality of objects (the character objects CH1 to CH3 and the field objects OB1 and OB2) are arranged in the virtual game space as shown in FIG. 24 with a reference position being defined as shown in FIG. 24.

When rendering the scene as viewed from the viewpoint A of FIG. 24, mask data is produced based on the positions of the character objects CH1 to CH3. The field object OB1, which is closer to the viewpoint (the viewpoint A) than the reference position, is subjected to the masking process using the mask data, while the field object OB2, which is farther away from the viewpoint than the reference position, is rendered normally. As a result, a game image as shown in FIG. 25 is obtained.

When rendering the scene as viewed from the viewpoint B of FIG. 24, mask data is produced based on the positions of the character objects CH1 to CH3. The field object OB2, which is closer to the viewpoint (the viewpoint B) than the reference position, is subjected to the masking process using the mask data, while the field object OB1, which is farther away from the viewpoint than the reference position, is rendered normally. As a result, a game image as shown in FIG. 26 is obtained.

Figure 25:
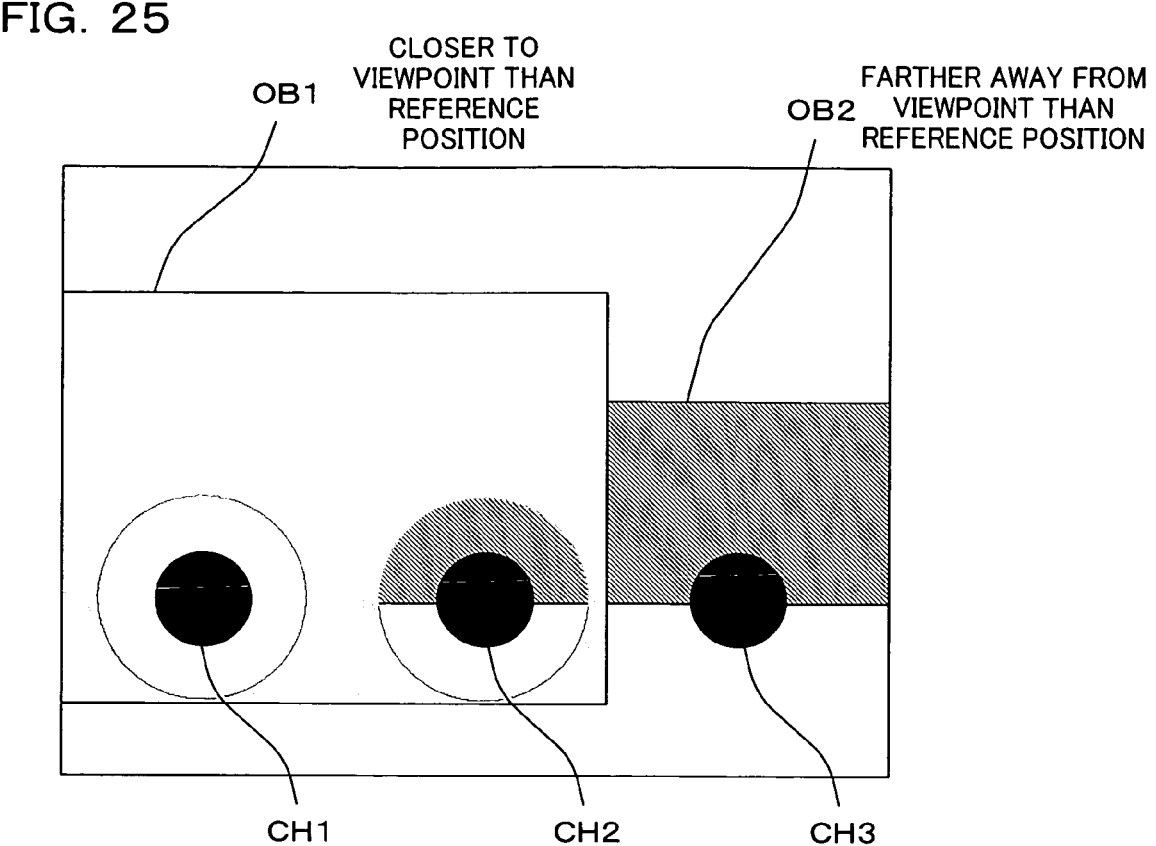
FIG. 25 shows an example of a game image according to a second embodiment.
Figure 26:
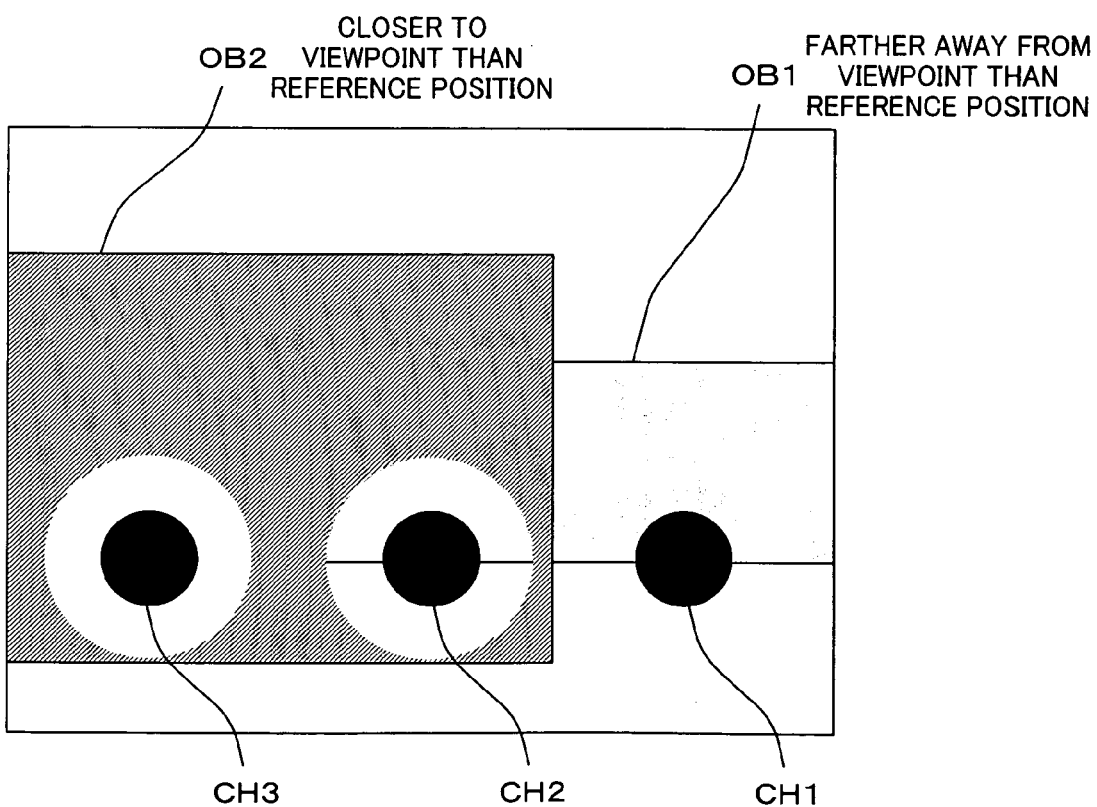
FIG. 26 shows an example of a game image according to the second embodiment.

In the game images of FIG. 25 and FIG. 26, the character objects CH1 to CH3 are all displayed, and no portion of any field object that is farther away from the viewpoint than a character object is omitted unnecessarily.

The details of the operation of the second embodiment will now be described while focusing on what is different from the first embodiment.

Figure 27:
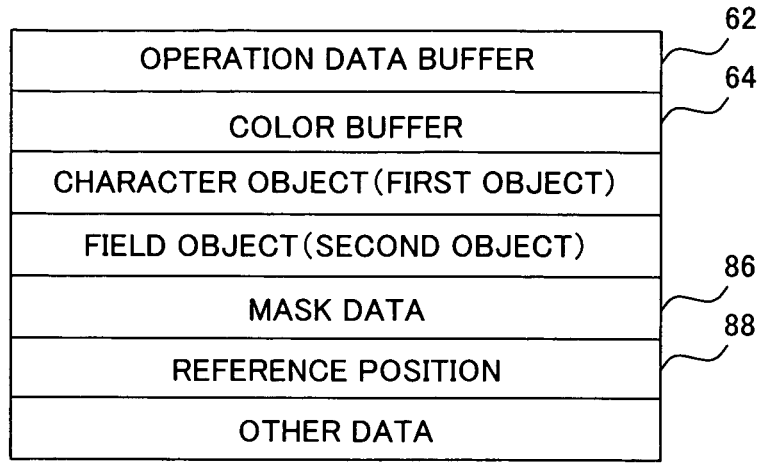
FIG. 27 shows a part of a memory map of the main memory 28 according to the second embodiment.

In the second embodiment, a reference position 88 as described above is stored in the main memory 28 as shown in FIG. 27. It is assumed that the reference position is defined as the distance from the viewpoint.

The rendering process of the second embodiment will now be described with reference to the flow chart of FIG. 28. Note that the flow chart of FIG. 28 only shows a portion of the rendering process, and the remaining steps are as shown in the flow chart of FIG. 9. Moreover, like steps in the flow chart of FIG. 28 to those in the flow chart of FIG. 9 are denoted by like reference numerals.

Figure 9:
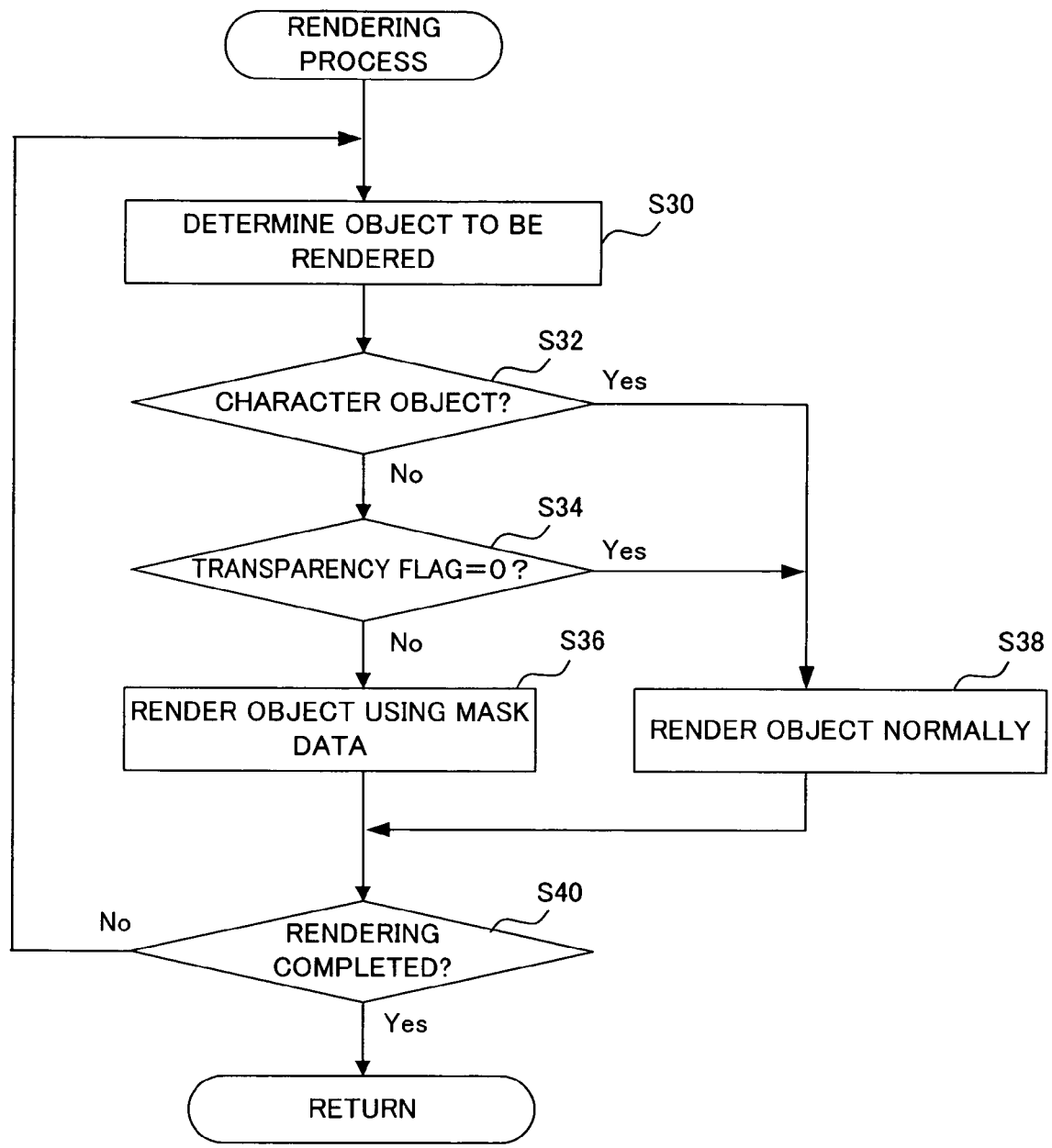
FIG. 9 shows a flow chart of a rendering process.
Figure 28:
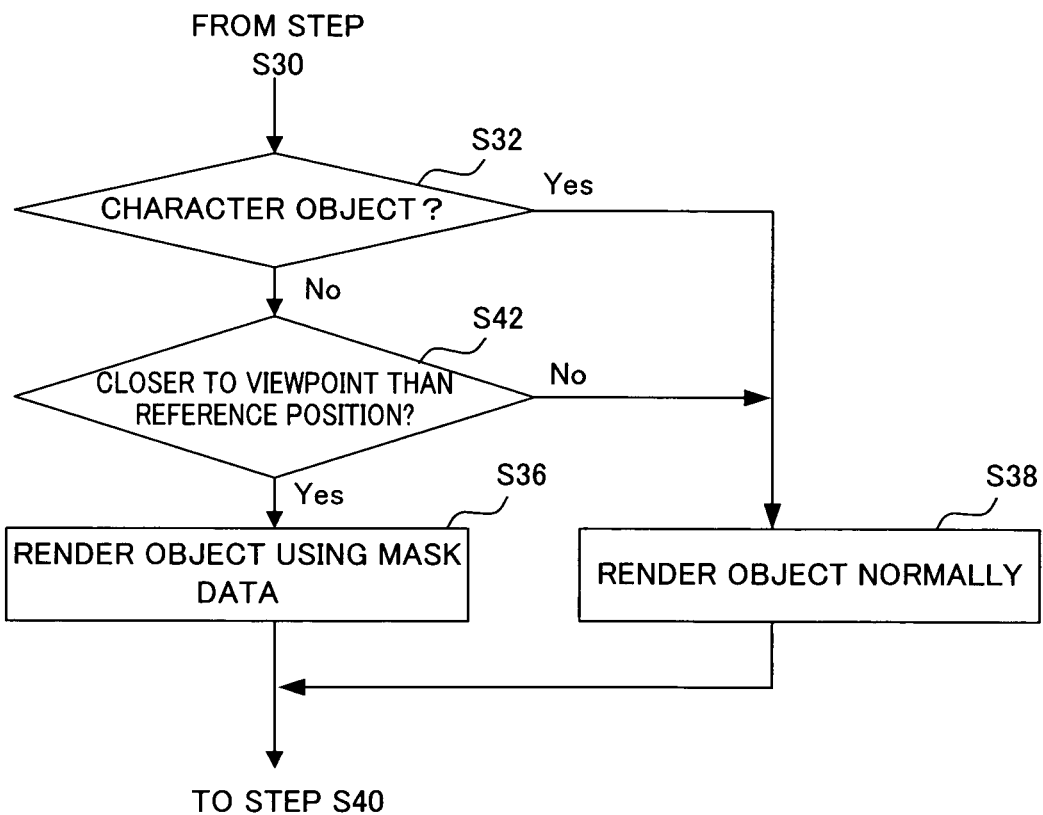
FIG. 28 shows a flow chart of a rendering process according to the second embodiment.

After an object to be rendered is determined in step S30 of FIG. 9, it is determined in step S32 of FIG. 28 whether or not the object to be rendered is a character object. The process proceeds to step S38 if the object is a character object, and to step S34 otherwise (i.e., if it is a field object).

In step S42, it is determined with reference to the main memory 28 whether or not the field object to be rendered is closer to the viewpoint than the reference position 88. The process proceeds to step S36 if the field object to be rendered is closer to the viewpoint than the reference position 88, and to step S38 otherwise (i.e., if it is farther away from the viewpoint than the reference position 88).

In step S36, the object to be rendered (a field object that is closer to the viewpoint than the reference position 88) is rendered by using the mask data 86 stored in the main memory 28 in the mask producing process.

In step S38, the object to be rendered (a character object or a field object that is farther away from the viewpoint than the reference position 88) is rendered normally.

Through a rendering process as described above, game images as shown in FIG. 25 and FIG. 26 are produced.

Figure 29:
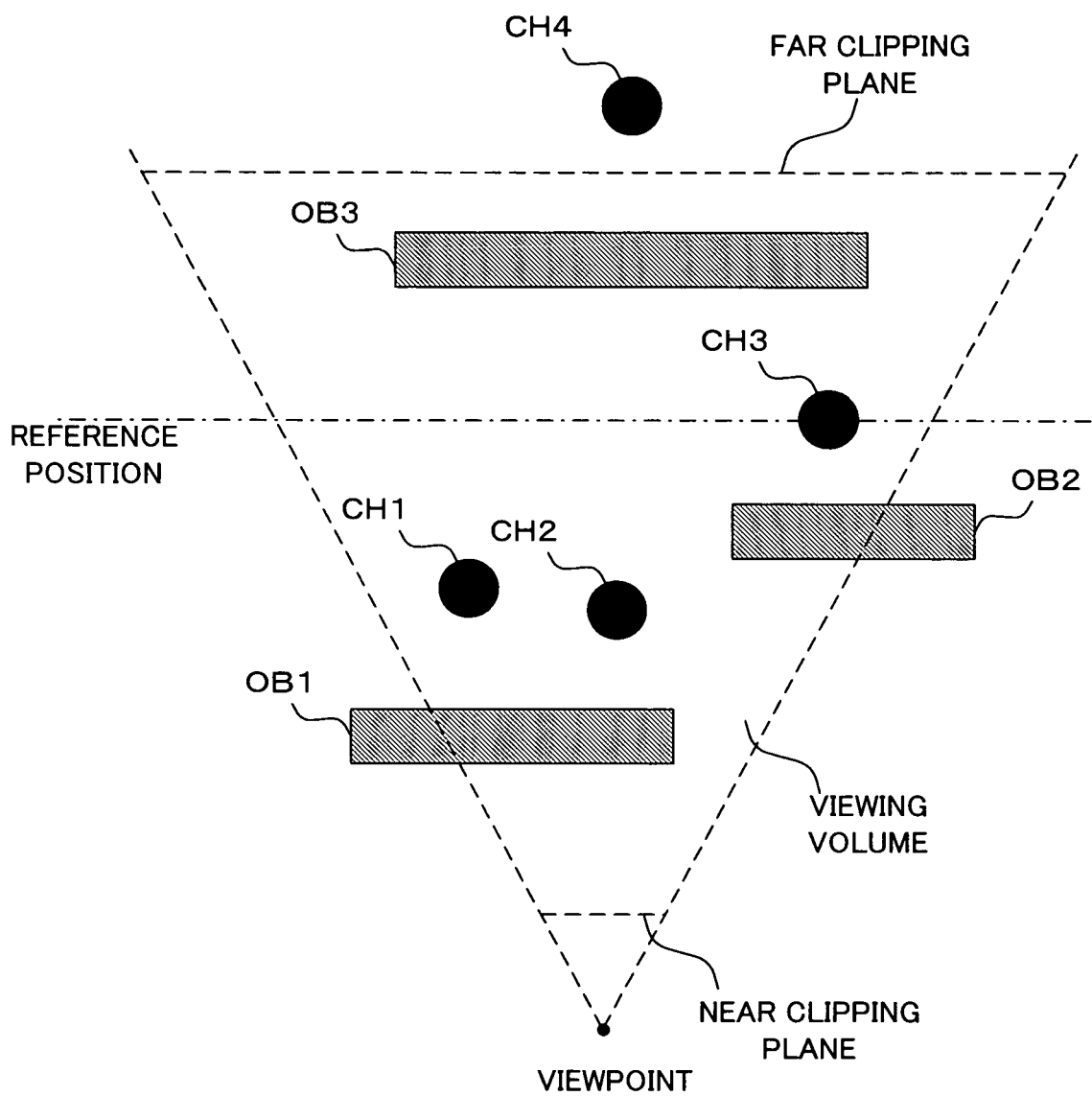
FIG. 29 shows an example of how a reference position is defined.
Figure 30:
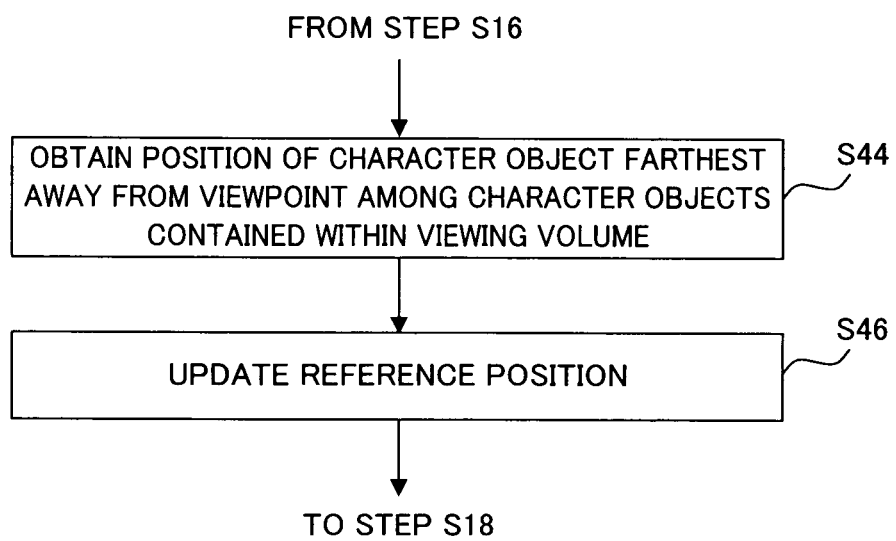
FIG. 30 shows a flow chart of a main process according to a variation of the second embodiment.

While the reference position is defined as the distance from the viewpoint in the present embodiment, the exemplary embodiment presented herein is not limited to this. For example, the reference position may be defined as the position of a particular character object, as mentioned above. In such a case, the reference position 88 stored in the main memory 28 needs to be updated as the particular character object moves.

Where there are a plurality of character objects (the character objects CH1 to CH4 in the illustrated example) in the virtual game space as shown in FIG. 29, it is preferred that the reference position is defined as the position of one of the character objects contained within the viewing volume (the character objects CH1 to CH3 in the illustrated example) that is farthest away from the viewpoint (the character object CH3 in the illustrated example). Thus, all of the character objects contained within the viewing volume will be displayed, and it is possible to obtain a game image that is not awkward (i.e., no portion of the field object OB3 is omitted in the example of FIG. 29). This can be realized by performing steps S44 to S46 of FIG. 30 before the rendering process in step S18 of FIG. 7. Specifically, in step S44, the process obtains the position of one of the character objects contained within the viewing volume that is farthest away from the viewpoint. In step S46, the position of the character object obtained in step S44 (the position may be an absolute position in the virtual space or a relative position with respect to the viewpoint) is stored in the main memory 28 as the reference position 88.

The method of the first embodiment and that of the second embodiment may be combined together. Specifically, the masking process using mask data may be performed only for field objects that are closer to the viewpoint than the reference position and whose transparency flag is "1", while not performing the masking process for the other field objects.

(Third Embodiment)

A third embodiment will now be described.

Figure 31:
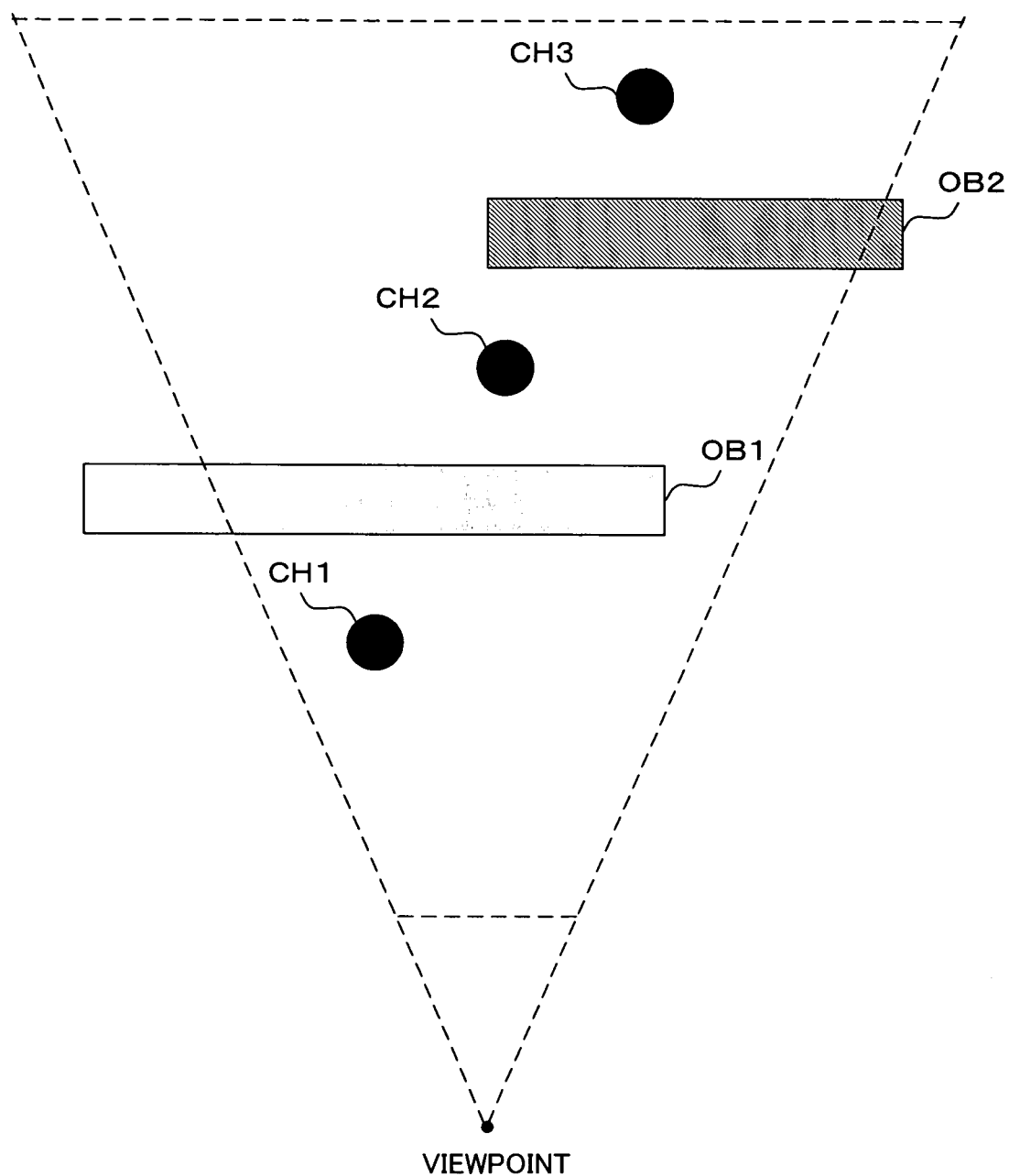
FIG. 31 shows an example of how objects are arranged in a virtual game space.

Consider a case where a plurality of objects (the character objects CH1 to CH3 and the field objects OB1 and OB2) are arranged in the 3D virtual game space as shown in FIG. 31. With such an arrangement, it is not possible, using the method of the first embodiment or that of the second embodiment, to obtain a game image in which the character object CH3 is displayed while portions of the field object OB2 that are behind the character objects CH1 and CH2 are not omitted unnecessarily. The third embodiment solves such a problem.

In the third embodiment, the process produces mask data as shown in FIG. 12, FIG. 14 or FIG. 19 with depth information being added thereto, and performs the masking process using such mask data.

Figure 32:
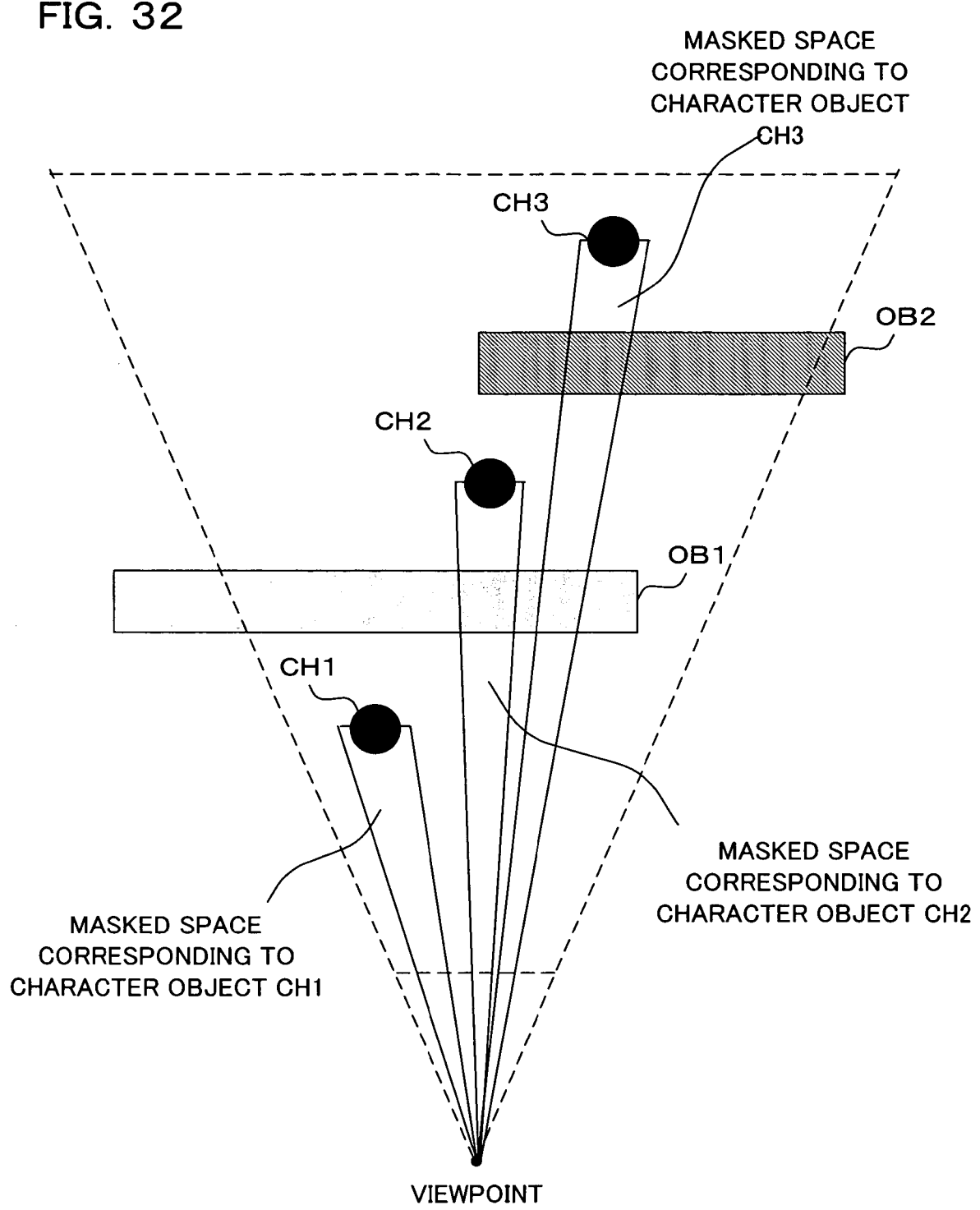
FIG. 32 shows the principle of a third embodiment.
Figure 33:
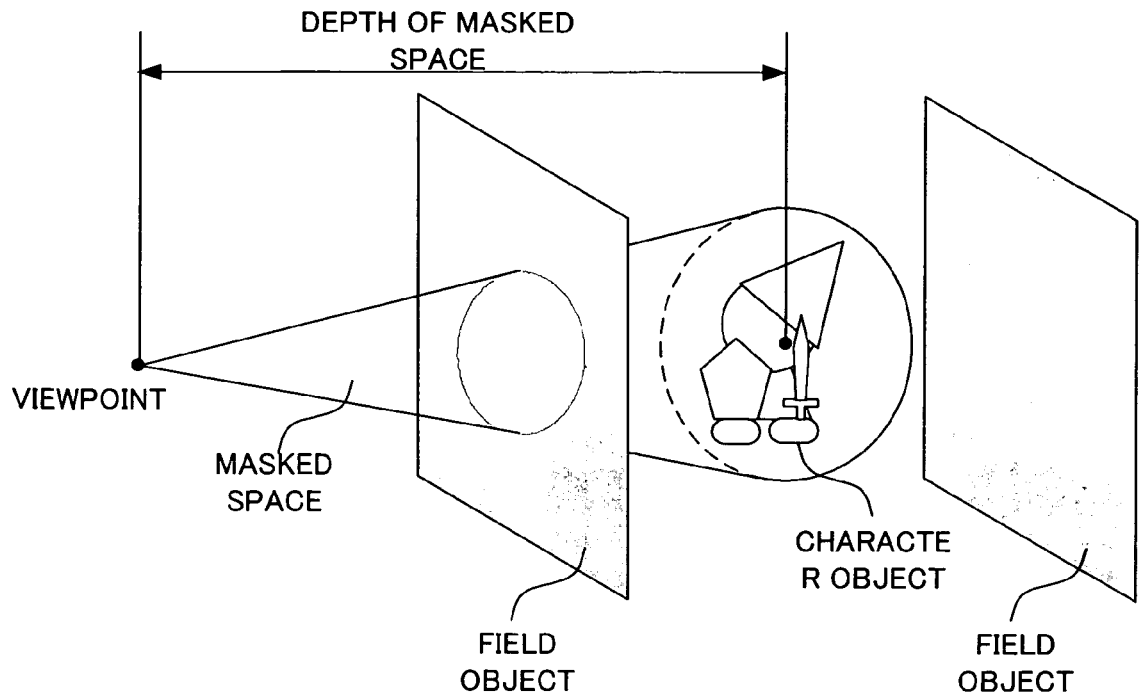
FIG. 33 shows a masked space.

FIG. 32 shows the principle of the third embodiment. For each masked area of mask data as shown in FIG. 12, FIG. 14 or FIG. 19, depth information according to the position of each character object is added, whereby it is possible to define a masked space extending from each of the character objects (the character objects CH1 to CH3) to the viewpoint, as shown in FIG. 32. Referring to FIG. 33, a masked space is a space extending from the position of a character object in the virtual game space to the viewpoint. The shape of a masked space is basically a conical shape where objects are rendered by a perspective projection, and is basically a columnar shape where objects are rendered by a parallel projection. Based on the mask data, the rendering process renders a portion of a field object within the masked space transparent (or semi-transparent) while rendering the rest of the field object normally, as shown in FIG. 33.

Figure 34:
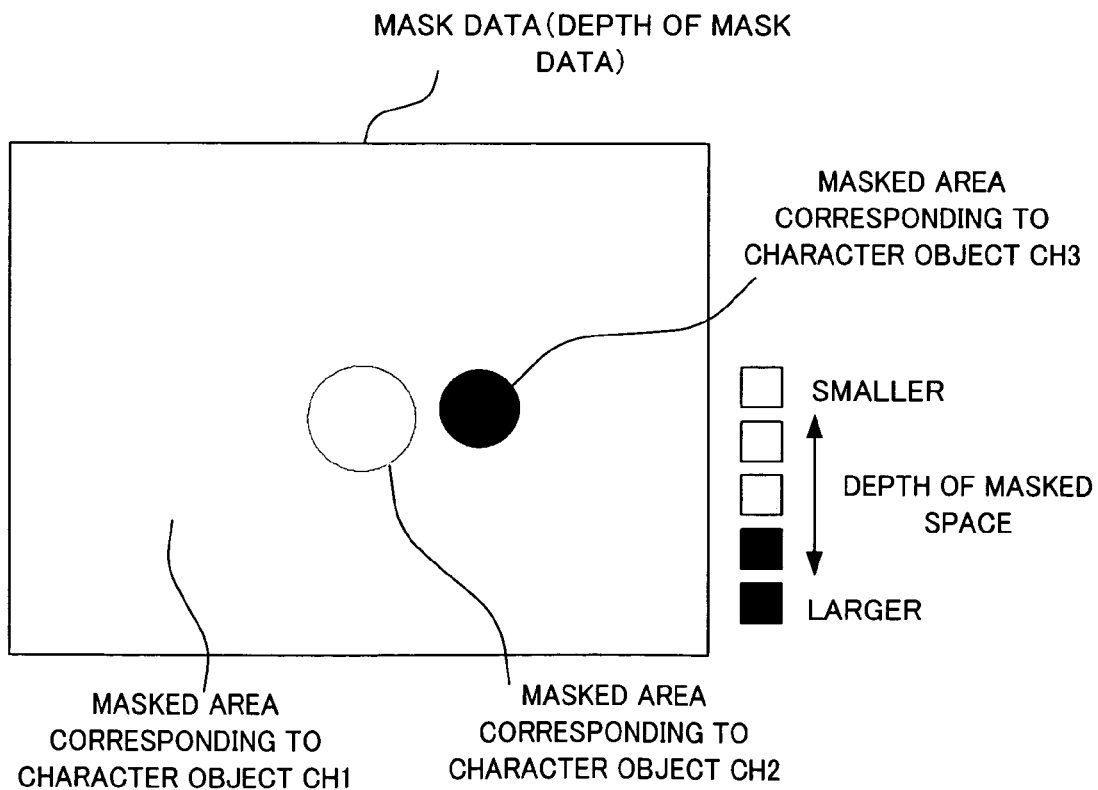
FIG. 34 shows an example of depth mask data produced in the third embodiment.

FIG. 34 shows an example of mask data produced in the third embodiment. While the mask producing process of the third embodiment renders a masked area based on the position of each character object projected onto the screen plane as in the first embodiment, the depth of the color of the masked area is determined according to the depth of the masked space (i.e., the distance from the viewpoint to the corresponding character object). In the example of FIG. 34, the depth of the color of the masked area increases as the depth of the masked space increases. The depth of the color of a masked area may have any number of levels. Note that the depth of the color of a masked area in the mask data of FIG. 12 or FIG. 14 represents the transparency, whereas the depth of the color of a masked area in the mask data of FIG. 34 represents the depth of the masked space. In the mask data of FIG. 34, the size of each masked area may also be varied so that it is possible to realize an image as shown in FIG. 17. Specifically, the masked area can be rendered smaller as the depth of the masked space increases. Thus, it is possible to realize a more sophisticated game image. Wherever necessary, mask data defining the transparency as shown in FIG. 12 or FIG. 14 will be referred to as "color mask data", distinguished from mask data defining the depth of a masked space as shown in FIG. 34, which will be referred to as "depth mask data".

Figure 35:
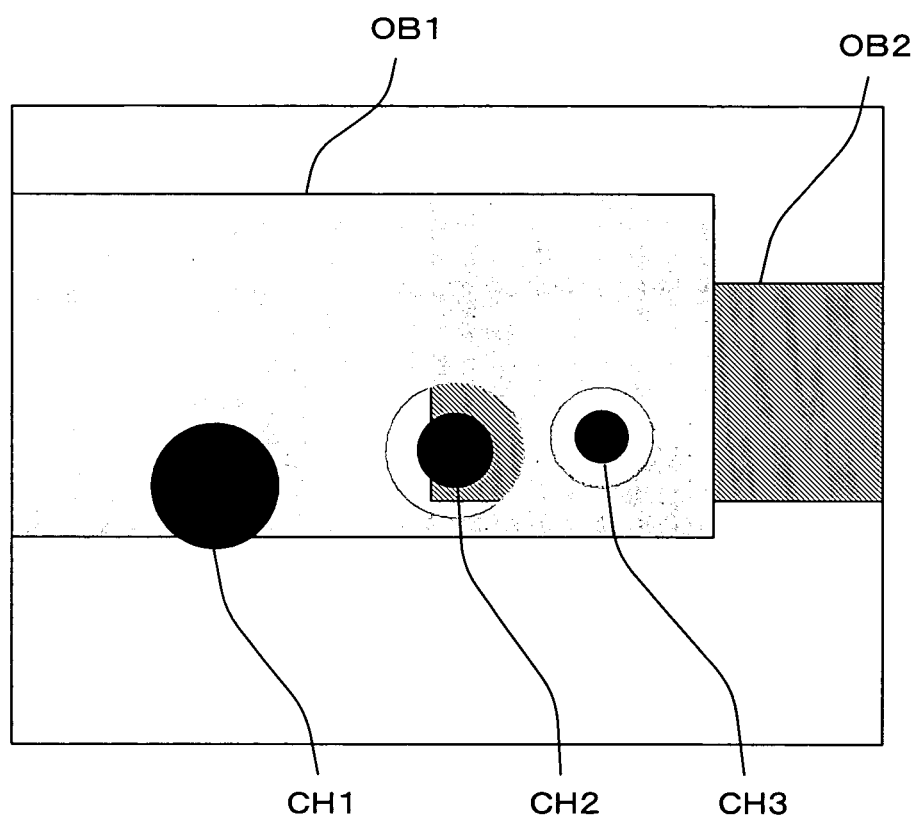
FIG. 35 shows an example of a game image according to the third embodiment.

In the rendering process, the field objects OB1 and OB2 are rendered by using mask data as shown in FIG. 34. Specifically, the field objects OB1 and OB2 are rendered so that any portion of the field objects OB1 and OB2 that is contained within any masked space will be rendered with a transparency of 100% (i.e., such a portion is not rendered in the color buffer 64) while the remaining portion will be rendered with a transparency of 0% (i.e., it is rendered normally). As a result, a game image as shown in FIG. 35 is obtained. In the game image of FIG. 35, the character object CH3 is displayed while portions of the field objects OB1 and OB2 that are behind the character objects CH1 and CH2 are not omitted unnecessarily.

Figure 36:
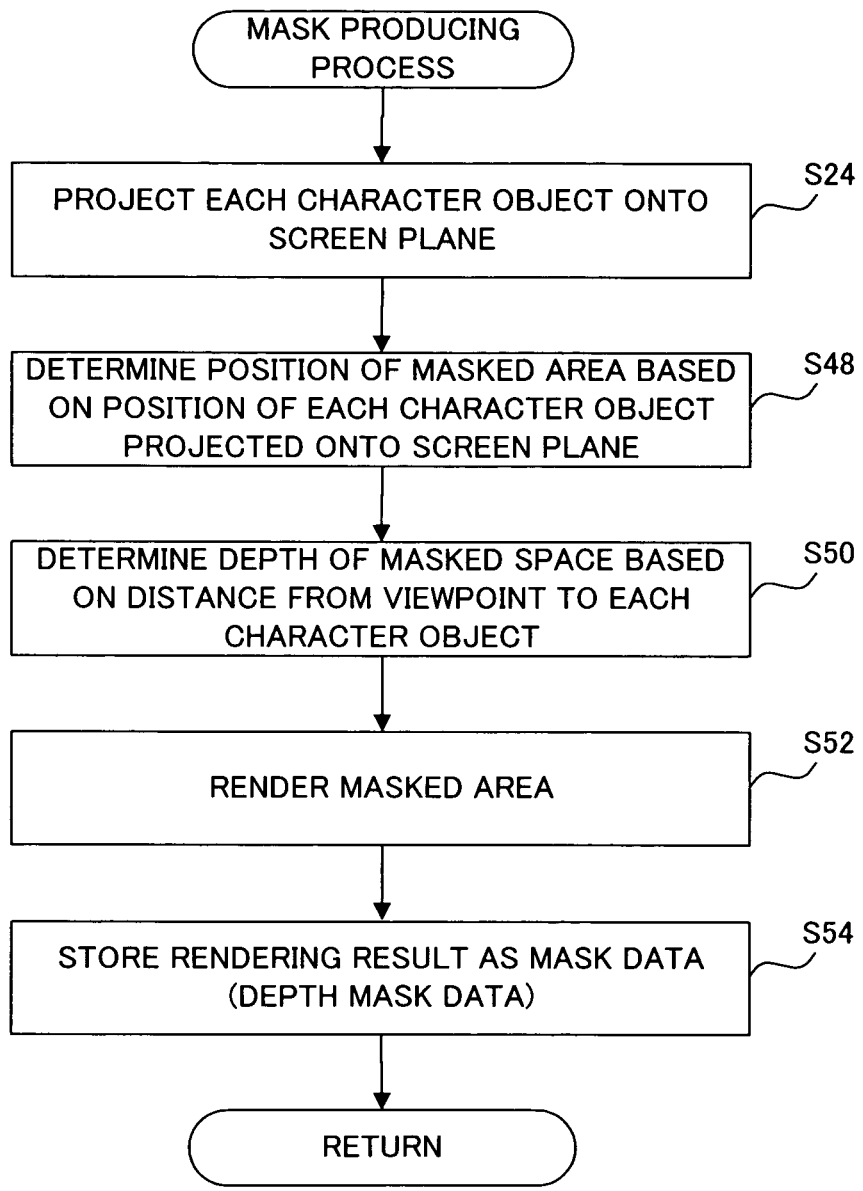
FIG. 36 shows a flow chart of a mask producing process according to the third embodiment.

The details of the mask producing process of the third embodiment will now be described with reference to the flow chart of FIG. 36.

In step S24, each character object is projected onto the screen plane as in the first and second embodiments. In step S26, the position of each masked area is determined based on the position of each character object on the screen plane. In step S28, the process determines the depth of the color of each masked area in the mask data according to the distance from the viewpoint to the corresponding character object. In step S30, the masked area is rendered based on the determination results from step S26 and step S28. In step S32, image data obtained in step S30 is stored in the main memory 28 as mask data.

Figure 37:
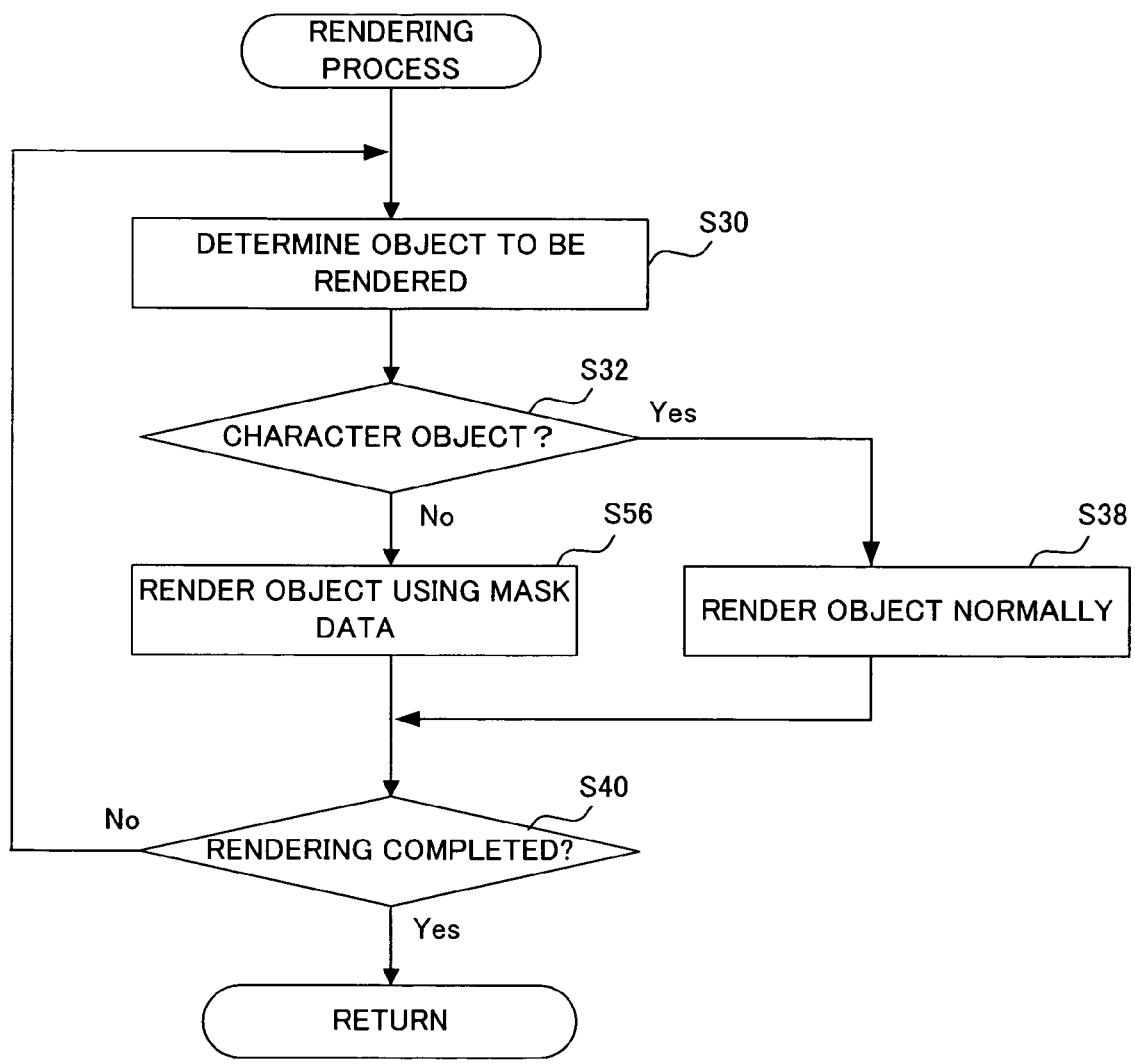
FIG. 37 shows a flow chart of a rendering process according to the third embodiment.

The details of the rendering process of the third embodiment will now be described with reference to the flow chart of FIG. 37. FIG. 37 differs from FIG. 9 in that step S34 is absent and step S36 is replaced by step S56. Therefore, steps other than step S56 will not be described below.

It is determined in step S32 whether or not an object to be rendered is a character object, and the process proceeds to step S56 if it is not a character object (i.e., if it is a field object). In step S56, the object to be rendered (a field object) is rendered by using the mask data 86 stored in the main memory 28 in mask producing process. Specifically, the object is rendered so that any portion of the object that is within a masked area when projected onto the screen plane and whose distance from the viewpoint is smaller than the depth of the masked space represented by the mask data will be rendered with a transparency of 100% (i.e., such a portion is not rendered in the color buffer 64) while the remaining portion will be rendered with a transparency of 0% (i.e., it is rendered normally).

Figure 38:
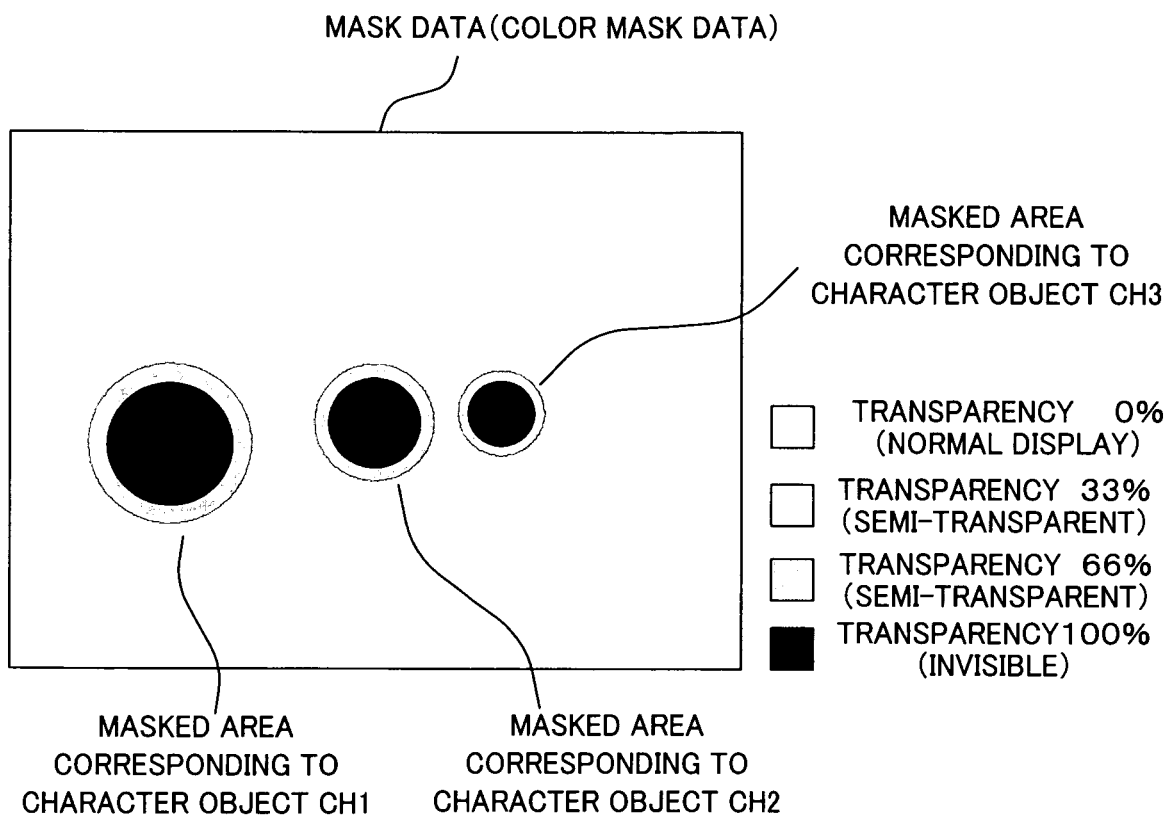
FIG. 38 shows an example of color mask data produced in the third embodiment.

While a field object is rendered by using only depth mask data in the present embodiment, color mask data may be used in addition to depth mask data so that the transparency of the field object is gradually varied around the boundary of the masked area as shown in FIG. 16. Specifically, in the mask producing process, color mask data as shown in FIG. 38, for example, is produced in addition to the depth mask data of FIG. 34, and the two sets of mask data are stored in the main memory 28. In the rendering process, a portion of the object to be rendered that is contained within the masked space is distinguished from the rest of the object based on the depth mask data, and the transparency (alpha value) for the portion contained within the masked space is varied based on the color mask data.

Figure 39:
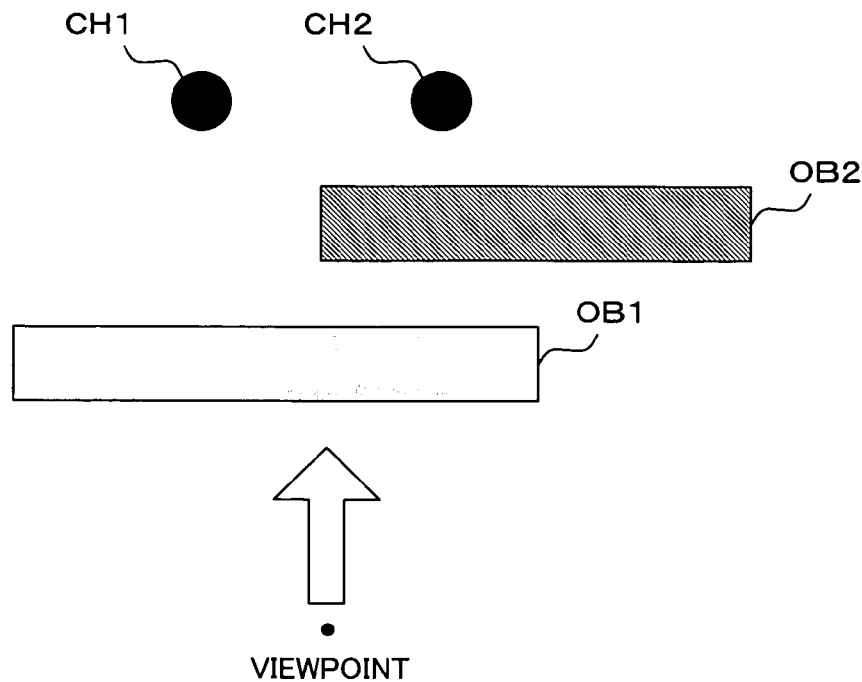
FIG. 39 shows an example of how objects are arranged in a virtual game space.
Figure 40:
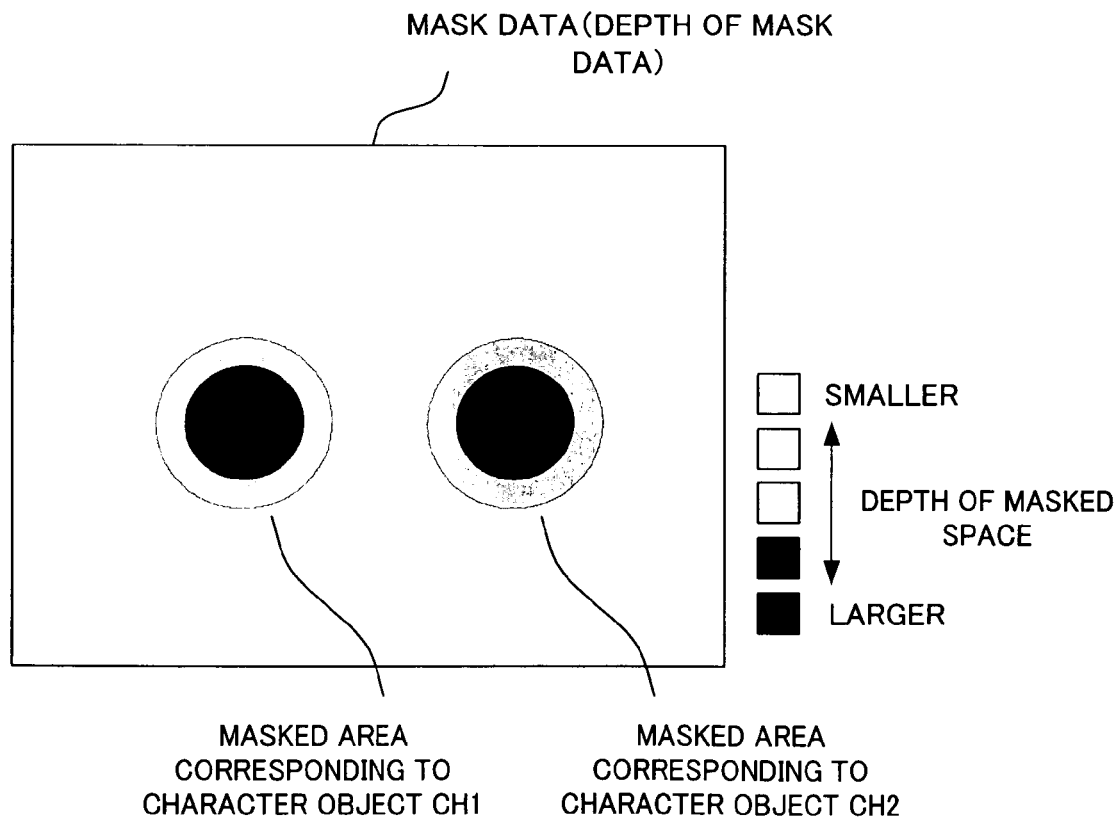
FIG. 40 shows an example of depth mask data produced in the third embodiment.
Figure 41:
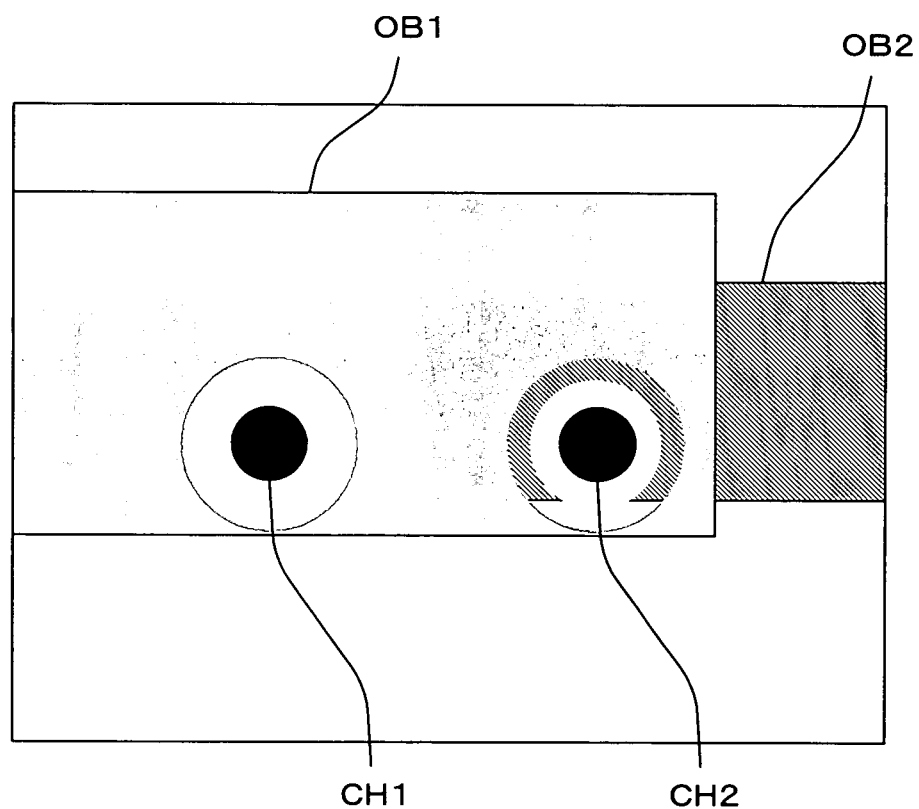
FIG. 41 shows an example of a game image according to the first embodiment.
Figure 42:
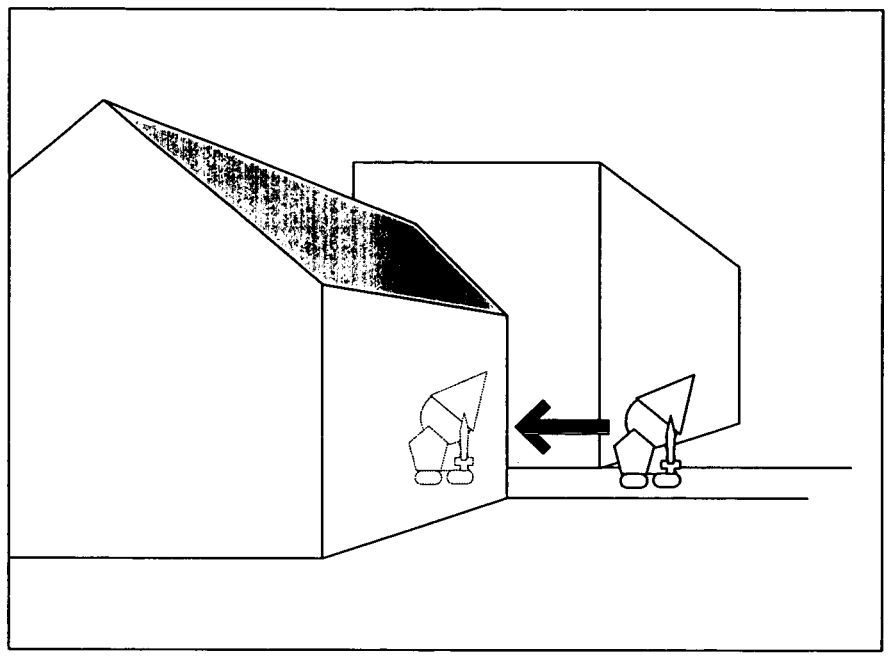
FIG. 42 shows an example of a conventional game image.
Figure 43:
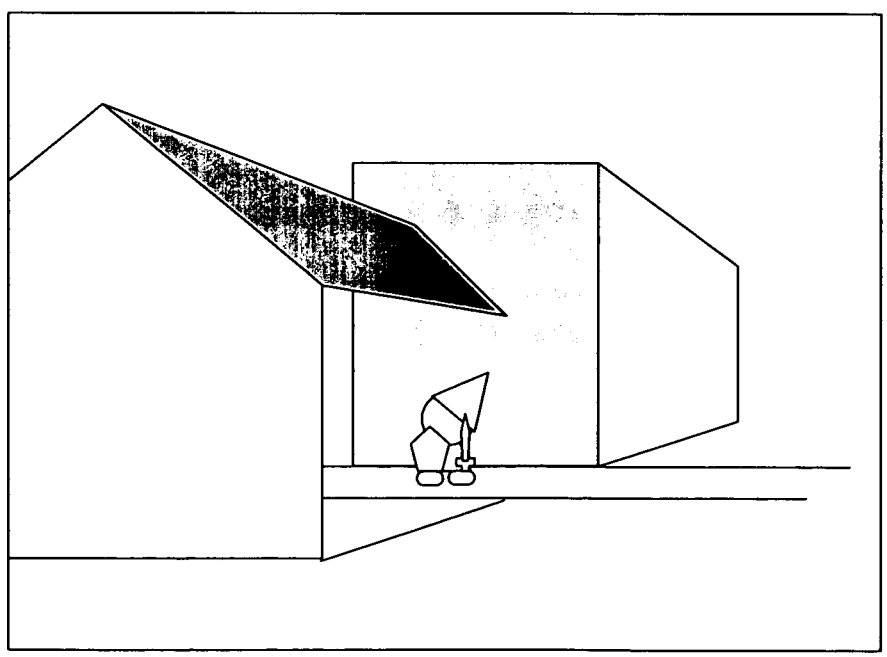
FIG. 43 shows another example of a conventional game image.

While each masked area in the depth mask data has a uniform color depth as shown in FIG. 34 in the present embodiment, the present invention is not limited to this. For example, where the character objects CH1 and CH2 and the field objects OB1 and OB2 are arranged in the virtual game space as shown in FIG. 39, the process may produce depth mask data as shown in FIG. 40. In FIG. 40, each masked area is rendered so that the color depth decreases at a position farther away from the center of the masked area. By rendering the field objects OB1 and OB2 of FIG. 39 by using such depth mask data, a game image as shown in FIG. 41 is obtained. The user cannot determine from the game image of FIG. 35 whether the character object CH3 is on the near side of the field object OB2 or behind the field object OB2, whereas the user can clearly determine from the game image of FIG. 41 that the character object CH2 is behind the field object OB2.

While the exemplary embodiment presented herein has been described in detail, the foregoing description is in all aspects illustrative and not restrictive. It is understood that numerous other modifications and variations can be devised without departing from the scope of the exemplary embodiment.

What is claimed is:

1. A video game device, comprising:
   at least one controller operated by a user;
   object storing locations for storing a position of each of a plurality of objects including at least one first object present in a 3D virtual game space; and
   one or more computer processors configured to perform:
   mask data producing for producing mask data according to a position of the first object in the virtual game space;
   the video game device further comprising: mask data storing locations for storing the produced mask data;
   the one or more computer processors further configured to perform:
   projection for projecting each object present in the virtual game space onto a screen plane based on a viewpoint defined in the virtual game space;
   game image producing for rendering each object based on a result of the projection produce a game image; and
   display control for displaying the produced game image on a display device, wherein:
   the mask data producing produces mask data such that a portion of each object, which portion is in a predetermined masked area centered around a position of the first object in a screen of the display device, is made transparent while a remaining portion of said each object, which remaining portion is outside the masked area, is displayed normally; and
   the game image producing does not perform a masking process when rendering the first object and performs the masking process using the mask data only when rendering a second object other than the first object present in the virtual game space, wherein the mask data producing produces mask data such that each object is made transparent in a predetermined masked area including a position of the first object in a screen of the display device while each object is displayed normally in a remaining area, with a transparency of each object being gradually varied around a boundary of the masked area, and wherein
   the transparency of each object takes multiple different values from the center of the first object to the boundary of the masked area.

2. The video game device according to claim 1, further comprising transparent object identification information storing locations for storing transparent object identification information that indicates whether or not to perform the masking process using the mask data for each second object, wherein the game image producing performs the masking process using the mask data only for a particular second object or particular second objects according to the transparent object identification information stored in the transparent object identification information storing locations.

3. The video game device according to claim 1, wherein the game image producing performs the masking process using the mask data only for a second object that is closer to the viewpoint defined in the virtual game space than a predetermined reference position.

4. The video game device according to claim 3, wherein the game image producing performs the masking process using the mask data only for a second object that is closer to the viewpoint defined in the virtual game space than the first object.

5. The video game device according to claim 3, wherein the one or more computer processors configured to further perform reference position determined for, where there are a plurality of first objects in a viewing volume defined in the virtual game space, determining the reference position to be a position of one of the plurality of first objects that is farthest away from the viewpoint defined in the virtual game space, wherein the game image producing performs the masking process using the mask data only for a second object that is closer to the viewpoint defined in the virtual game space than the determined reference position.

6. The video game device according to claim 1, wherein the mask data producing produces mask data such that each object is made transparent in a predetermined masked space extending from the position of the first object in the virtual game space to the viewpoint defined in the virtual game space while each object is displayed normally in a remaining area.

7. The video game device according to claim 6, wherein there are a plurality of first objects in a viewing volume defined in the virtual game space, the mask data producing produces mask data defining a plurality of masked spaces each having a length according to a position of the corresponding first object.

8. The video game device according to claim 1, wherein the game image producing changes an alpha value of each dot of each object according to the mask data, and determines a color of each pixel of the game image through an alpha blending operation based on the changed alpha value.

9. The video game device according to claim 1, wherein the first object is a player character controlled by the user operating the at least one controller.

10. The video game device according to claim 1, wherein: the mask data producing produces mask data having a lower resolution than that of the produced game image; and the game image producing uses the mask data while enlarging the mask data.

11. A non-transitory storage medium storing an image processing program for instructing a computer of a video game device including at least one controller operated by a user to perform:
   storing a position of each of a plurality of objects including at least one first object present in a 3D virtual game space in object storing locations;
   mask data producing for producing mask data according to a position of the first object in the virtual game space;
   storing the produced mask data in mask data storing locations;
   projection for projecting each object present in the virtual game space onto a screen plane based on a viewpoint defined in the virtual game space;
   game image producing for rendering each object based on a result of the projection to produce a game image; and
   display control for displaying the produced game image on a display device, wherein:
   the mask data producing produces mask data such that a portion of each object, which portion is in a predetermined masked area centered around a position of the first object in a screen of the display device, is made transparent while a remaining portion of said each object, which remaining portion is outside the masked area, is displayed normally; and the game image producing does not perform a masking process when rendering the first object and performs the masking process using the mask data only when rendering a second object other than the first object present in the virtual game space, wherein the mask data producing produces mask data such that each object is made transparent in a predetermined masked area including a position of the first object in a screen of the display device while each object is displayed normally in a remaining area, with a transparency of each object being gradually varied around a boundary of the masked area, and wherein the transparency of each object takes multiple different values from the center of the first object to the boundary of the masked area.

12. The non-transitory storage medium according to claim 11, wherein:

the image processing program instructs the computer to further perform storing transparent object identification information in transparent object identification information storing locations that indicates whether or not to perform the masking process using the mask data for each second object;

and the game image producing performs the masking process using the mask data only for a particular second object or particular second objects according to the stored transparent object identification information.

13. The non-transitory storage medium according to claim 11, wherein the game image producing performs the masking process using the mask data only for a second object that is closer to the viewpoint defined in the virtual game space than a predetermined reference position.

14. The non-transitory storage medium according to claim 13, wherein the game image producing performs the masking process using the mask data only for a second object that is closer to the viewpoint defined in the virtual game space than the first object.

15. The non-transitory storage medium according to claim 13, wherein:

the image processing program instructs the computer to further perform reference position determination for, where there are a plurality of first objects in a viewing volume defined in the virtual game space, determining the reference position to be a position of one of the plurality of first objects that is farthest away from the viewpoint defined in the virtual game space;

and the game image producing programmed logic circuitry performs the masking process using the mask data only for a second object that is closer to the viewpoint defined in the virtual game space than the determined reference position.

16. The non-transitory storage medium according to claim 11, wherein the mask data producing produces mask data such that each object is made transparent in a predetermined masked space extending from the position of the first object in the virtual game space to the viewpoint defined in the virtual game space while each object is displayed normally in a remaining area.

17. The non-transitory storage medium according to claim 16, wherein where there are a plurality of first objects in a viewing volume defined in the virtual game space, the mask data producing produces mask data defining a plurality of masked spaces each having a length according to a position of the corresponding first object.

18. The non-transitory storage medium according to claim 11, wherein the game image producing changes an alpha value of each dot of each object according to the mask data, and determines a color of each pixel of a game image through an alpha blending operation based on the changed alpha value.

19. The non-transitory storage medium according to claim 11, wherein the first object is a player character controlled by the user operating the at least one controller.

20. The non-transitory storage medium according to claim 11, wherein: the mask data producing produces mask data having a lower resolution than that of the produced game image; and the game image producing uses the mask data while enlarging the mask data.

21. A non-transitory storage medium storing a game program for instructing a computer of a video game device to perform a perspective projection transformation for a plurality of objects in a 3D virtual game space based on a viewpoint defined in the virtual game space so as to render a game image to be displayed on a display screen in a rendering buffer, wherein the computer program instructs the computer to perform:

object positioning for determining first 3D coordinates based on which a first object is positioned in the 3D virtual game space and second 3D position coordinates based on which a second object is positioned in the 3D virtual game space;

calculation for performing a perspective projection transformation for the 3D position coordinates of the first object based on the viewpoint to obtain 2D coordinates of the first object on the display screen;

producing mask data for one screen in which a mask image of a predetermined shape associated with the first object is rendered at a position in a rendering buffer area associated with 2D coordinates of the first object on the display screen;

rendering the first object positioned at the first 3D coordinates in the rendering buffer while performing a perspective projection transformation, wherein the first object is rendered in the rendering buffer without referring to the mask data; and rendering the second object positioned at the second 3D coordinates in the rendering buffer while performing a perspective projection transformation, wherein the second object is rendered in the rendering buffer while referring to the mask data so that a transparency of a portion of the second object that overlaps with the mask image is varied from that of other portions not overlapping with the mask image, wherein the transparency of said portion of the second object takes multiple different values from the center of the first object to the boundary of the mask image.

22. The non-transitory storage medium according to claim 21, wherein:

the mask image is an image whose color depth gradually increases or decreases from a center thereof toward a periphery thereof; and the game image is rendered in the transparency varying so that the transparency of the second object changes according to the color depth of the mask image in an area where the mask image and the second object overlap with each other.

23. The video game device according to claim 1, wherein the area of the first object in the screen of the display device is less than the area of the predetermined masked area.

24. The non-transitory storage medium according to claim 11, wherein the area of the first object in the screen of the display device is less than the area of the predetermined masked area.

25. The non-transitory storage medium according to claim 21, wherein the area of the first object is less than the area of the mask image.

* * * * *